(12) United States Patent
Muto et al.

(10) Patent No.: US 10,941,687 B2
(45) Date of Patent: Mar. 9, 2021

(54) CATALYST TEMPERATURE ESTIMATION DEVICE, CATALYST TEMPERATURE ESTIMATION SYSTEM, DATA ANALYSIS DEVICE, AND CONTROL DEVICE OF INTERNAL COMBUSTION ENGINE

(71) Applicant: TOYOTA JIDOSHA KABUSHIKI KAISHA, Toyota (JP)

(72) Inventors: Harufumi Muto, Miyoshi (JP); Atsushi Nagai, Toyota (JP); Yosuke Hashimoto, Nagakute (JP); Masakazu Aoki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/781,021

(22) Filed: Feb. 4, 2020

(65) Prior Publication Data

US 2020/0263581 A1 Aug. 20, 2020

(30) Foreign Application Priority Data

Feb. 20, 2019 (JP) .............................. JP2019-028473

(51) Int. Cl.
*F01N 3/18* (2006.01)
*F01N 9/00* (2006.01)
(Continued)

(52) U.S. Cl.
CPC ............... *F01N 3/18* (2013.01); *F01N 9/005* (2013.01); *F02B 37/183* (2013.01); *G06N 20/00* (2019.01);
(Continued)

(58) Field of Classification Search
CPC ........ F01N 3/18; F01N 9/005; F01N 2900/12; F01N 2560/14; F01N 2900/0402;
(Continued)

(56) References Cited

U.S. PATENT DOCUMENTS 6,276,334 B1 * 8/2001 Flynn ...................... F02B 19/14
123/435
6,508,242 B2 * 1/2003 Jaliwala .................. F01N 9/005
123/676

(Continued)

FOREIGN PATENT DOCUMENTS

JP 2015-117621 A 6/2015

*Primary Examiner* — Carl C Staubach
(74) *Attorney, Agent, or Firm* — Oblon, McClelland, Maier & Neustadt, L.L.P.

(57) ABSTRACT

A catalyst temperature estimation device that estimates a temperature of a catalyst provided in an exhaust passage of an internal combustion engine includes a storage device and processing circuitry. The storage device stores mapping data that specifies a mapping that uses multiple input variables to output an estimation value of the temperature of the catalyst. The multiple input variables include at least one variable of an ambient temperature variable or an excess amount variable. The multiple input variables further include a fluid energy variable, which is a state variable related to energy of fluid flowing into the catalyst, and a previous cycle value of the estimation value of the temperature of the catalyst. The processing circuitry is configured to execute an acquisition process, a temperature calculation process, and an operation process. The mapping data includes data that is learned through machine learning.

13 Claims, 10 Drawing Sheets

(51) Int. Cl.
  *G06N 20/00*   (2019.01)
  *F02B 37/18*   (2006.01)
(52) U.S. Cl.
  CPC ...... *F01N 2560/06* (2013.01); *F01N 2560/14* (2013.01); *F01N 2900/0402* (2013.01); *F01N 2900/12* (2013.01); *F01N 2900/16* (2013.01)
(58) Field of Classification Search
  CPC . F01N 2560/06; F01N 2900/16; G06N 20/00; F02B 37/183
  See application file for complete search history.

(56) References Cited

U.S. PATENT DOCUMENTS

| | | | |
|---|---|---|---|
| 7,810,476 B2* | 10/2010 | Wang | F02D 35/025 |
| | | | 123/568.16 |
| 9,657,670 B2* | 5/2017 | Wu | F02D 35/0007 |
| 10,167,806 B2* | 1/2019 | Surnilla | F02M 69/046 |
| 10,621,291 B2* | 4/2020 | Pekar | F02D 41/2432 |
| 10,635,976 B2* | 4/2020 | Nagasaka | G06N 3/084 |
| 2016/0003180 A1* | 1/2016 | McNulty | F02D 41/222 |
| | | | 701/102 |
| 2020/0263592 A1* | 8/2020 | Muto | F02P 5/15 |
| 2020/0263594 A1* | 8/2020 | Muto | F01N 11/00 |
| 2020/0263618 A1* | 8/2020 | Muto | F02D 41/1467 |
| 2020/0271069 A1* | 8/2020 | Muto | F02D 41/2461 |

\* cited by examiner

CATALYST TEMPERATURE ESTIMATION DEVICE, CATALYST TEMPERATURE ESTIMATION SYSTEM, DATA ANALYSIS DEVICE, AND CONTROL DEVICE OF INTERNAL COMBUSTION ENGINE

BACKGROUND

1. Field

The following description relates to a catalyst temperature estimation device, a catalyst temperature estimation system, a data analysis device, and a control device of an internal combustion engine.

2. Description of Related Art

Japanese Laid-Open Patent Publication No. 2015-117621 discloses an example of a device that estimates the temperature of a catalyst provided in an exhaust passage of an internal combustion engine. The device uses a large amount of mapping data to estimate the temperature of the catalyst in a transient state.

When a large amount of mapping data is used to estimate a transient temperature, the number of man-hours for adapting (i.e. calculating) the mapping data increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hereinafter, multiple aspects and effects of the present disclosure will be described.

Aspect 1. A catalyst temperature estimation device configured to estimate a temperature of a catalyst provided in an exhaust passage of an internal combustion engine is provided. The catalyst temperature estimation device includes a storage device and processing circuitry. The storage device stores mapping data that specifies a mapping that uses multiple input variables to output an estimation value of the temperature of the catalyst. The multiple input variables include at least one variable of an ambient temperature variable or an excess amount variable. The ambient temperature variable is a variable related to an ambient temperature around the internal combustion engine. An amount of fuel that reacts with oxygen contained in a fluid flowing into the catalyst without excess or deficiency is an ideal fuel amount. The excess amount variable is a variable that corresponds to an excess amount of an actual fuel flowing into the catalyst in relation to the ideal fuel amount. The multiple input variables further include a fluid energy variable, which is a state variable related to an energy of the fluid flowing into the catalyst, and a previous cycle value of the estimation value of the temperature of the catalyst. The processing circuitry is configured to execute: an acquisition process that acquires the at least one variable, the fluid energy variable, and the previous cycle value of the estimation value of the temperature of the catalyst; a temperature calculation process that repeatedly calculates the estimation value of the temperature of the catalyst based on an output of the mapping that uses data acquired by the acquisition process as an input; and an operation process that operates an operation unit of the internal combustion engine based on the estimation value of the temperature of the catalyst. The operation unit is configured to adjust the temperature of the catalyst. The mapping data includes data that is learned through machine learning.

With this configuration, since the estimation value of the temperature of the catalyst is calculated based on the previous cycle value of the estimation value of the temperature of the catalyst, a temperature of the catalyst that reflects changes in the temperature in the previous cycle is calculated instead of a temperature of the catalyst in a steady state. In other words, with this configuration, the temperature of the catalyst is calculated based on the previous cycle value of the estimation value of the temperature of the catalyst and the changes in the temperature of the catalyst in the previous cycle. With this configuration, the ambient temperature variable may be included in the input to the mapping. When the ambient temperature variable is included in the input to the mapping, the estimation value of the temperature of the catalyst is calculated while reflecting that the speed of heat discharged from the catalyst changes depending on the ambient temperature. Hence, when the ambient temperature variable is included in the input to the mapping, the accuracy of the estimation value is increased compared to a case in which the ambient temperature variable is not included in the input to the mapping. In addition, with this configuration, the excess amount variable may be included in the input to the mapping. When the excess amount variable is included in the input to the mapping, the estimation value of the temperature of the catalyst is calculated while recognizing the amount of heat generated when oxygen is stored in the catalyst and the heat of oxidation generated when the fuel is oxidized with oxygen stored in the catalyst. Hence, when the excess amount variable is included in the input to the mapping, the accuracy of the estimation value is increased as compared to a configuration in which the excess amount variable is not included in the input to the mapping. Moreover, if the estimation value of the temperature of the catalyst is calculated using the mapping data that uses the ambient temperature variable or the excess amount variable as an input, the number of man-hours for adaptation (i.e. calculating the mapping data) is increased as compared to a configuration in which the ambient temperature variable or the excess amount variable is not used as the input. In this regard, with the configuration described above, at least a part of the mapping data is generated through machine learning so that the number of man-hours for adaptation is reduced.

Aspect 2. In the catalyst temperature estimation device according to aspect 1, the internal combustion engine includes a turbocharger provided upstream of the catalyst in the exhaust passage. The exhaust passage includes a bypass passage that bypasses the turbocharger. The bypass passage has a flow path cross-sectional area that is allowed to be adjusted by a wastegate valve. The input to the mapping includes a flow path variable that differs from the fluid energy variable. The flow path variable is a variable related to the flow path cross-sectional area of the bypass passage. The acquisition process includes a process that acquires the flow path variable. The temperature calculation process includes a process that calculates the estimation value based on an output of the mapping further using the flow path variable as the input to the mapping.

Since the specific heat of a turbocharger is large, the temperature of the exhaust flowing into the catalyst tends to differ depending on the proportion of the amount of fluid passing through the turbocharger and flowing into the catalyst to the amount of fluid flowing into the catalyst. In this regard, with the configuration described above, the estimation value of the temperature of the catalyst is calculated based on the flow path variable. This increases the accuracy of the estimation value of the temperature of the catalyst as compared to a configuration that does not use the flow path variable.

Aspect 3. In the catalyst temperature estimation device according to aspect 1 or 2, the fluid energy variable includes a temperature variable that is a variable related to a temperature of the fluid flowing into the catalyst. The input to the mapping includes an ignition variable that differs from the fluid energy variable. The ignition variable is a variable related to an ignition timing of the internal combustion engine. The acquisition process includes a process that acquires the ignition variable. The temperature calculation process includes a process that calculates the estimation value based on an output of the mapping further using the ignition variable as the input to the mapping.

As the ignition timing is retarded, an after-burning action becomes more prominent. The after-burning action is an action of fuel that is not burned in a combustion chamber and is burned after the fuel is discharged to the exhaust passage from the combustion chamber. The amount of heat received by the catalyst changes in accordance with the degree of the after-burning action. In this regard, with the configuration described above, the estimation value of the temperature of the catalyst is calculated based on the ignition variable. This increases the accuracy of the estimation value as compared to a configuration that does not use the ignition variable.

Aspect 4. In the catalyst temperature estimation device according to any one of aspects 1 to 3, the catalyst is supported by a filter configured to capture particulate matter (PM) in a fluid flowing into the filter. The input to the mapping includes an accumulation amount variable that is a variable related to an amount of PM accumulated in the filter. The acquisition process includes a process that acquires the accumulation amount variable. The temperature calculation process includes a process that calculates the estimation value based on an output of the mapping further using the accumulation amount variable as the input to the mapping.

When oxygen flows into the filter on which particulate matter (PM) is captured, the PM is oxidized to generate the heat of oxidation. The heat of oxidation causes increases in the temperatures of the filter and the catalyst. In this regard, with the configuration described above, the estimation value of the temperature of the catalyst is calculated based on the accumulation amount variable. This increases the accuracy of the estimation value as compared to a configuration that does not use the accumulation amount variable.

Aspect 5. In the catalyst temperature estimation device according to any one of aspects 1 to 4, the catalyst is divided into N partial regions arranged in a flow direction of the fluid. The N partial regions are arranged from a first partial region to an Nth partial region in order from the upstream side. The acquisition process includes a process that acquires a previous cycle value of an estimation value of a temperature of each region from the first partial region to the Nth partial region as the previous cycle value of the estimation value of the temperature of the catalyst. The mapping is one of multiple mappings. The multiple mappings include a first mapping being a mapping that outputs the estimation value of the temperature of the first partial region and an ith mapping being a mapping that outputs an estimation value of a temperature of an ith partial region, where "i" is an integer that is greater than or equal to two and less than or equal to N. The first mapping uses at least a variable acquired by the acquisition process, the variable excluding the previous cycle values of the estimation values of the partial regions arranged downstream of the first partial region, as an input. The ith mapping uses at least an estimation value of a temperature of an "i–1"th partial region and a previous cycle value of the estimation value in the ith partial region as inputs. The temperature calculation process includes a process that calculates the estimation value of the temperature of each region from the first partial region to the Nth partial region through processes that include a process that uses at least a variable acquired by the acquisition process, the variable excluding the previous cycle values of the estimation values of the partial regions arranged downstream of the first partial region, as an input to the first mapping to calculate the estimation value of the temperature of the first partial region, and a process that uses at least the estimation value of the temperature of the "i–1"th partial region and the previous cycle value of the estimation value of the ith partial region as inputs to the ith mapping to calculate the estimation value of the temperature of the ith partial region.

With this configuration, the temperature of the ith partial region is estimated based on the estimation value of the temperature of the "i–1"th partial region. Hence, the temperature of the ith partial region is estimated taking into consideration the heat exchange between the ith partial region and the i–1th partial region. Therefore, with the configuration described above, heat exchange between partial regions of the catalyst is readily reflected in the estimation of the temperature as compared to a case in which the mapping that calculates a single temperature of the catalyst is configured by a single mapping. Hence, with the configuration described above, the accuracy of the estimation of the temperature is increased while simplifying the structure of each mapping.

Aspect 6. The catalyst temperature estimation device according to any one of aspects 1 to 5, the mapping is one of multiple mappings. The multiple mappings include a steady mapping and a time constant mapping. The steady mapping uses the fluid energy variable and at least one of the ambient temperature variable or the excess amount variable as inputs to output a steady temperature, which is a value on which the temperature of the catalyst converges when the internal combustion engine is steadily running. The time constant mapping uses the steady temperature, the previous cycle value of the estimation value, and an air amount variable, which is a variable related to an intake air amount of the internal combustion engine, as inputs to output a time constant variable, which is a variable that determines a time constant in which the temperature of the catalyst converges to the steady temperature. The acquisition process includes a process that acquires the air amount variable. The temperature calculation process includes: a steady calculation process that calculates the steady temperature based on an output of the steady mapping using the fluid energy variable and at least one of the ambient temperature variable or the excess amount variable as inputs; a time constant calculation process that calculates the time constant variable through the time constant mapping using the air amount variable, the steady temperature, and the previous cycle value of the estimation value as inputs; and a process that calculates the estimation value by causing the estimation value of the temperature of the catalyst to approach the steady temperature in accordance to the time constant variable calculated by the time constant calculation process. Mapping data that specifies the steady mapping is learned through the machine learning.

With this configuration, a transient behavior of the temperature of the catalyst is also estimated using a temperature in the steady state and the time constant variable. If the steady state temperature is calculated using mapping data that uses the ambient temperature variable or the excess amount variable as an input, the number of man-hours for adaptation is increased as compared to a configuration that does not use the ambient temperature variable and the excess amount variable as inputs. In this regard, with the configuration described above, the mapping data is generated through machine learning so that the number of man-hours for adaptation is reduced.

Aspect 7. In the catalyst temperature estimation device according to aspect 1, the mapping uses time series data of the fluid energy variable as an input in addition to the previous cycle value of the estimation value of the temperature of the catalyst to output the estimation value of the temperature of the catalyst. The acquisition process includes a process that acquires the time series data of the fluid energy variable as the fluid energy variable. A calculation process of the estimation value calculated by the temperature calculation process using the fluid energy variable as the input to the mapping is a calculation process of the estimation value using the time series data of the fluid energy variable as the input to the mapping.

With this configuration, the temperature of the catalyst is estimated based on the time series data of the fluid energy variable. This allows use of more accurate information regarding the energy of the fluid in a time interval of the calculation of the estimation value as compared to a configuration that uses a single sampling value of the fluid energy variable. Ultimately, the accuracy of the estimation of the temperature is increased.

Aspect 8. In the catalyst temperature estimation device according to aspect 7, the time series data of the fluid energy variable includes time series data of a temperature variable that is a variable related to the temperature of the fluid flowing into the catalyst from the upstream side of the catalyst in the exhaust passage in a predetermined period.

With this configuration, the fluid energy variable is configured by the time series data of the temperature variable of the fluid flowing upstream of the catalyst. This allows the energy flow rate of the fluid flowing into the catalyst to be expressed with high accuracy.

Aspect 9. In the catalyst temperature estimation device according to aspect 8, the time series data of the fluid energy variable is configured to include the time series data of the temperature variable in the predetermined period and an air amount variable that is a variable related to an intake air amount of the internal combustion engine in the predetermined period. The air amount variable in the predetermined period has fewer samplings than the time series data of the temperature variable.

The flow rate of thermal energy of a fluid is determined by the temperature of the fluid and the amount of air. With the configuration described above, the fluid energy variable may be a variable that expresses the flow rate of thermal energy of the fluid with high accuracy. Moreover, with the configuration described above, a single sampling value of the air amount variable corresponds to two or more sampling values of the temperature variable. This reduces the dimension of the input variable of the mapping.

Aspect 10. In the catalyst temperature estimation device according to any one of aspects 1 to 9, the mapping data is one of different kinds of mapping data, the storage device stores the different kinds of mapping data, and the temperature calculation process includes a selection process that selects one of the different kinds of mapping data as mapping data that is used to calculate the estimation value of the temperature of the catalyst.

In a configuration in which a single mapping is capable of outputting an estimation value of the temperature of the catalyst with high accuracy in any situation, the structure of the mapping may become more complicated. In this regard, in the configuration described above, different kinds of mapping data are provided. This allows for a selection of appropriate mapping in accordance with different situations. When different kinds of mapping data are provided, the structure of each mapping is simplified as compared to a configuration in which only a single mapping is provided.

Aspect 11. In the catalyst temperature estimation device according to aspect 10, the storage device stores different kinds of mapping data that specify separate mappings corresponding to at least one of whether a fuel is supplied to a combustion chamber of the internal combustion engine, whether a warm-up process of the catalyst is executed, or whether a heating process of the catalyst is executed. The selection process includes a process that selects one of the different kinds of mapping data as mapping data that is used to calculate the estimation value of the temperature of the catalyst.

The amount of heat received by the catalyst greatly differs depending on whether or not the fuel is supplied, whether or not a warm-up process of the catalyst is executed, or whether or not a heating process is executed. If this is responded to using a single mapping, the structure of the mapping becomes more complicated. In this regard, with the configuration described above, a mapping for calculating the estimation value of the temperature is selected in accordance with whether or not the fuel is supplied, whether or not the warm-up process of the catalyst is executed, or the heating process is executed. Thus, each mapping is specific to whether or not the fuel is supplied, whether or not the warm-up process of the catalyst is executed, or whether or not the heating process is executed. Ultimately, the structure of each of different kinds of mapping is simplified.

Aspect 12. In the catalyst temperature estimation device according to any one of aspects 1 to 11, the operation process includes a process that sets an air-fuel ratio of a mixture that is burned in a combustion chamber of the internal combustion engine to be richer when the temperature of the catalyst is greater than or equal to a predetermined temperature than when the temperature of the catalyst is less than the predetermined temperature.

With this configuration, based on the above-described estimation value, the process that controls the air-fuel ratio so that the air-fuel ratio is set to be rich is executed to lower the temperature of the fluid flowing into the catalyst so that the temperature of the catalyst will not be overly increased. It is determined whether or not to execute the process controlling the air-fuel ratio so that the air-fuel ratio is set to be rich based on accurate temperature information. This limits unnecessarily execution of the control setting the air-fuel ratio to be rich.

Aspect 13. A catalyst temperature estimation system that includes the processing circuitry and the storage device according to any one of aspects 1 to 12 is provided. The processing circuitry includes a first execution device and a second execution device. The first execution device is installed in a vehicle and is configured to execute the acquisition process, a vehicle side transmission process that transmits data acquired by the acquisition process outside the vehicle, a vehicle side reception process that receives a signal based on the estimation value calculated by the temperature calculation process, and the operation process. The second execution device is arranged outside the vehicle and is configured to execute an outside reception process that receives data transmitted by the vehicle side transmission process, the temperature calculation process, and an outside transmission process that transmits a signal based on the estimation value calculated by the temperature calculation process to the vehicle.

With this configuration, the temperature calculation process is executed outside the vehicle. This reduces computational loads imposed on an on-board device.

Aspect 14. A data analysis device that includes the second execution device and the storage device according to aspect 13 is provided.

Aspect 15. A control device of an internal combustion engine that includes the first execution device according to aspect 13 is provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a first embodiment of a catalyst temperature estimation device will be described with reference to the drawings.

Figure 1:
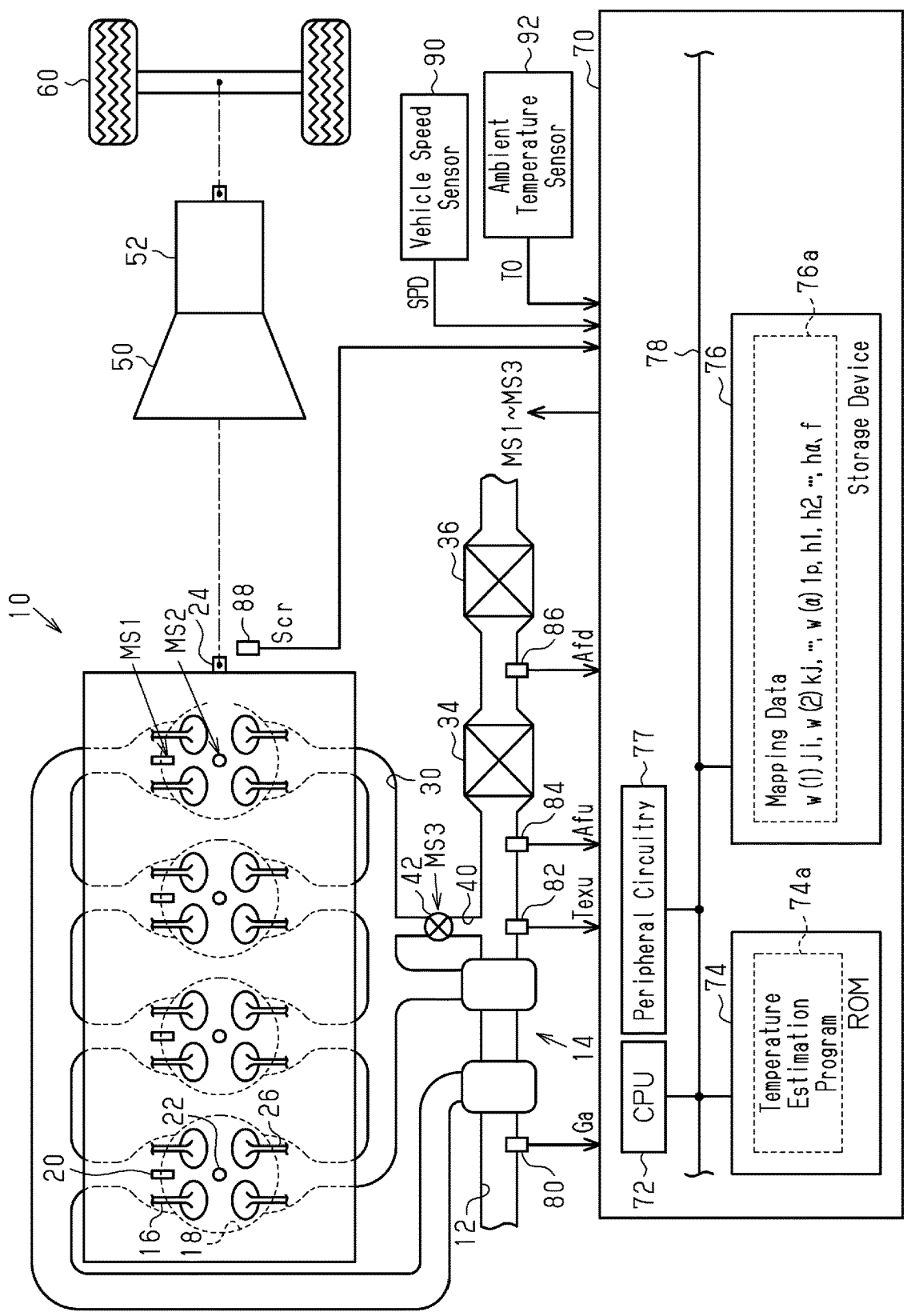
FIG. 1 is a diagram illustrating the configuration of a control device and a drive system of a vehicle according to a first embodiment.

FIG. 1 illustrates a vehicle VC in which an internal combustion engine 10 is installed. Air drawn into the internal combustion engine 10 from an intake passage 12 flows downstream through a turbocharger 14. When intake valves 16 open, the air flows into combustion chambers 18. The internal combustion engine 10 is provided with in-cylinder injection valves 20 that directly inject fuel into the combustion chambers 18 and ignition devices 22 that generate spark discharges. In the combustion chamber 18, a mixture of air and fuel is provided for combustion, and energy generated by the combustion is discharged as rotational energy of a crankshaft 24. When exhaust valves 26 open, the mixture provided for the combustion is discharged to an exhaust passage 30 as exhaust. A gasoline particulate filter (GPF) 34 is provided downstream of the turbocharger 14 in the exhaust passage 30. The GPF 34 is a filter configured to capture particulate matter contained in the exhaust and support a three-way catalyst capable of storing oxygen. A catalyst 36 is a three-way catalyst capable of storing oxygen and is provided downstream of the GPF 34. The exhaust passage 30 includes a bypass passage 40 through which the exhaust flows to the GPF 34 bypassing the turbocharger 14. The bypass passage 40 is provided with a wastegate valve 42 (hereinafter, referred to as the WGV 42) that regulates the flow path cross-sectional area of the bypass passage 40.

Drive wheels 60 are mechanically coupled to the crankshaft 24 through a torque converter 50 and a transmission device 52.

The internal combustion engine 10 is controlled by a control device 70. The control device 70 operates operation units such as the in-cylinder injection valve 20, the ignition device 22, and the WGV 42 of the internal combustion engine 10 to control the control variables of the internal combustion engine 10 such as the torque and the exhaust composition ratio. FIG. 1 illustrates operation signals MS 1 to MS 3 of the in-cylinder injection valve 20, the ignition device 22, and the WGV 42, respectively.

When the control device 70 controls the control variables, the control device 70 refers to an intake air amount Ga detected by an airflow meter 80, an exhaust temperature Texu detected by an exhaust temperature sensor 82 provided upstream of the GPF 34, and an upstream detection value Afu, which is a detection value of an upstream air-fuel ratio sensor 84 provided upstream of the GPF 34. In addition, the control device 70 refers to a downstream detection value Afd, which is a detection value of a downstream air-fuel ratio sensor 86 provided between the GPF 34 and the catalyst 36, an output signal Scr of a crank angle sensor 88, a vehicle speed SPD detected by a vehicle speed sensor 90, and an ambient temperature TO detected by an ambient temperature sensor 92.

The control device 70 includes a CPU 72, a ROM 74, a storage device 76, which is an electrically rewritable non-volatile memory, and peripheral circuitry 77. These components are configured to communicate with each other through a local network 78. The peripheral circuitry 77 includes, for example, a circuit that generates a clock signal to specify an internal operation, an electric power supply circuit, and a reset circuit.

The control device 70 controls the control variables described above by causing the CPU 72 to execute a program stored in the ROM 74.

Figure 2:
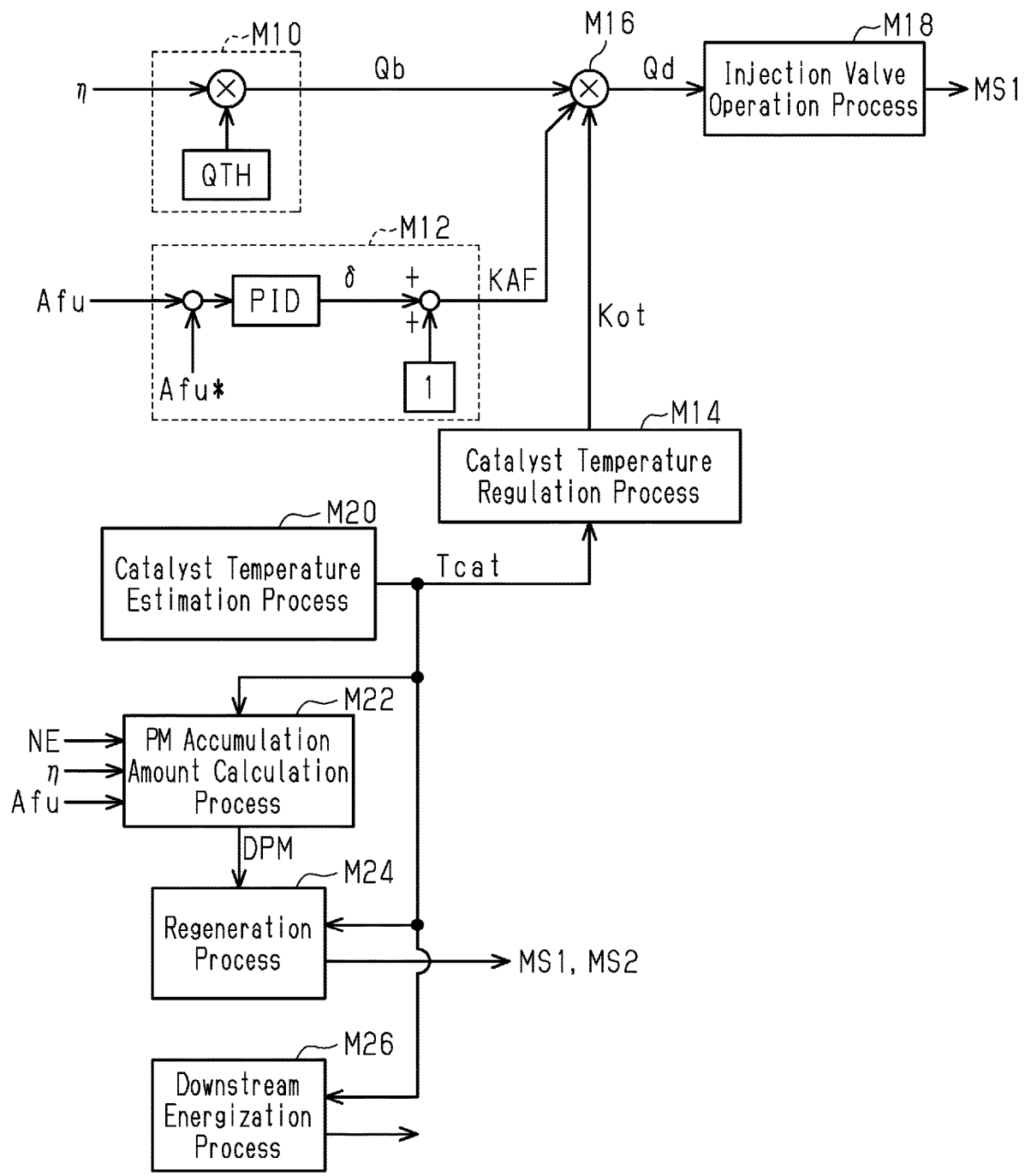
FIG. 2 is a block diagram illustrating some of the processes executed by the control device according to the first embodiment.

FIG. 2 illustrates some of the processes implemented when the CPU 72 executes the program stored in the ROM 74.

A base injection amount calculation process M10 calculates a base injection amount Qb, which is a base value of the amount of fuel that sets the air-fuel ratio of the mixture in the combustion chamber 18 to the target air-fuel ratio, based on the charging efficiency $\eta$. More specifically, for example, in a case in which the charging efficiency $\eta$ is expressed in a percentage, the base injection amount calculation process M10 may calculate the base injection amount Qb by multiplying the charging efficiency $\eta$ by a fuel amount QTH per 1% of the charging efficiency $\eta$, which sets the air-fuel ratio to the target air-fuel ratio. The base injection amount Qb is an amount of fuel that is calculated based on an amount of air filling the combustion chamber 18 so that the air-fuel ratio is controlled to the target air-fuel ratio. In the present embodiment, the stoichiometric air-fuel ratio is used as the target air-fuel ratio. The charging efficiency $\eta$ is a parameter that determines the amount of air filling the combustion chamber 18 and is calculated by the CPU 72 based on a rotational speed NE and the intake air amount Ga. The rotational speed NE is calculated by the CPU 72 based on the output signal Scr of the crank angle sensor 88.

A feedback process M12 calculates and outputs a feedback correction factor KAF by adding one to a correction ratio $\delta$ of the base injection amount Qb, which is a feedback operation amount, that is, an operation amount that causes the upstream detection value Afu to be a target value Afu* through feedback control. More specifically, the feedback process M12 sets the correction ratio $\delta$ to the sum of output values of a proportional control element and a derivative control element, which use the difference between the upstream detection value Afu and the target value Afu* as an input, and an output value of an integral control element that retains and outputs an integrated value of the value corresponding to the difference.

When a catalyst temperature Tcat, that is, the temperature of the GPF 34, is greater than or equal to a predetermined temperature, a catalyst temperature regulation process M14 calculates an increase factor Kot to be greater than one so that the GPF 34 is protected. When the catalyst temperature Tcat is less than the predetermined temperature, the catalyst temperature regulation process M14 sets the increase factor Kot to one.

A request injection amount calculation process M16 multiplies the base injection amount Qb by the feedback correction factor KAF and the increase factor Kot to calculate a request injection amount Qd. In the present embodiment, when the increase factor Kot is greater than one, the feedback process M12 is stopped so that the feedback correction factor KAF is fixed.

An injection valve operation process M18 outputs the operation signal MS1 to the in-cylinder injection valve 20 based on the request injection amount Qd to operate the in-cylinder injection valve 20.

A catalyst temperature estimation process M20 estimates the catalyst temperature Tcat. The catalyst temperature estimation process M20 will be descried in detail later.

A particulate matter (PM) accumulation amount calculation process M22 calculates a PM accumulation amount DPM based on, for example, the rotational speed NE, the charging efficiency $\eta$, the upstream detection value Afu, and the catalyst temperature Tcat. The PM accumulation amount DPM is the amount of PM, or particulate matter, accumulated in the GPF 34. More specifically, the PM accumulation amount calculation process M22 includes a process that map-calculates an amount of PM that is discharged based on mapping data that uses the rotational speed NE and the charging efficiency $\eta$ as input variables and uses the amount of PM that is discharged to the exhaust passage 30 as an output variable. The PM accumulation amount calculation process M22 further includes a process that calculates the ratio of discharged PM that is captured by the GPF 34 to the entire discharged PM to be a larger value when the PM accumulation amount DPM is small, than when the PM accumulation amount DPM is large. The PM accumulation amount calculation process M22 further includes a process that calculates the amount of PM oxidized by the GPF 34 to be a larger value when the catalyst temperature Tcat is high than when the catalyst temperature Tcat is low, in a case in which the upstream detection value Afu is leaner than the theoretical air-fuel ratio.

The mapping data is a data set of discrete values of an input variable and values of an output variable corresponding to each value of the input variable. For example, when the value of an input variable matches any one of the values of the input variable in the mapping data, the map computation may use the corresponding value of the output variable in the mapping data as the computation result. When the value of the input variable does not match any one of the values of the input variable in the mapping data, the map computation may obtain a value by interpolating multiple values of the output variable in the mapping data and use the value as the computation result.

When the PM accumulation amount DPM is greater than or equal to a predetermined amount, a regeneration process M24 executes heating control to increase the temperature of the GPF 34, and to oxidize and remove the PM captured by the GPF 34 by operating the operation units of the internal combustion engine 10 increasing the exhaust temperature, which are, for example, the in-cylinder injection valve 20 and the ignition device 22. More specifically, the regeneration process M24 includes a process that controls the catalyst temperature Tcat through the heating control so that the catalyst temperature Tcat is within a predetermined range.

A downstream energization process M26 starts to energize the downstream air-fuel ratio sensor 86 based on the catalyst temperature Tcat after the internal combustion engine 10 starts. In the present embodiment, the downstream energization process M26 regards the catalyst temperature Tcat as the temperature of the downstream air-fuel ratio sensor 86. When the catalyst temperature Tcat is greater than or equal to a specified value, the downstream energization process M26 starts to energize the downstream air-fuel ratio sensor 86.

Figure 3:
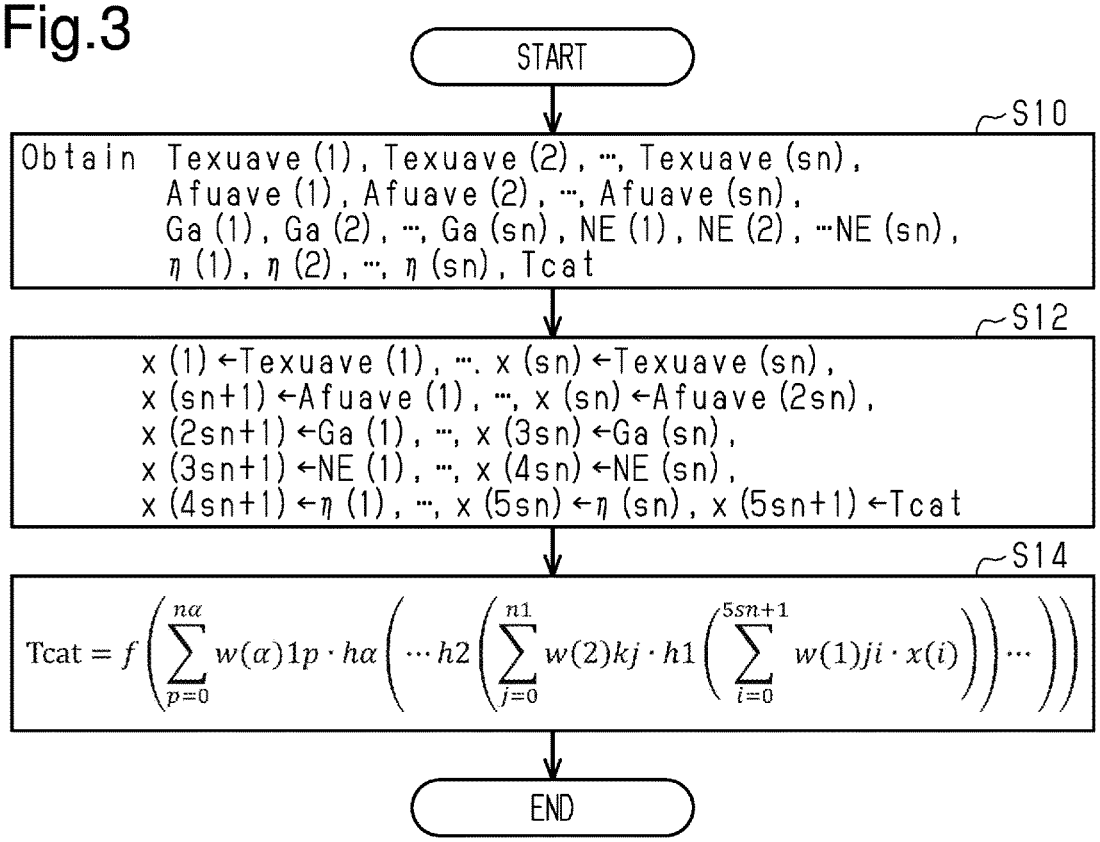
FIG. 3 is a flowchart illustrating the procedures of a catalyst temperature estimation process according to the first embodiment.

FIG. 3 illustrates the procedures of the catalyst temperature estimation process M20. The process illustrated in FIG. 3 is implemented, for example, by causing the CPU 72 to repeatedly execute a temperature estimation program 74a stored in the ROM 74 illustrated in FIG. 1 at predetermined time intervals. Hereinafter, the number of each step is represented by the letter S followed by a numeral.

In the series of steps illustrated in FIG. 3, the CPU 72 acquires time series data of an exhaust temperature average value Texuave, an upstream average value Afuave, the intake air amount Ga, the rotational speed NE, and the charging efficiency η in a predetermined period, and the CPU 72 also acquires the previous cycle value of the catalyst temperature Tcat, that is, the catalyst temperature Tcat calculated in the previous cycle of the process illustrated in FIG. 3 (S10). Hereinafter, points in time of sampling are denoted by "1, 2, . . . , and sn" in order from the earliest one. For example, the time series data of the rotational speed NE are expressed as "NE (1) to NE (sn)." The term "sn" refers to the number of pieces of data included in the time series data of each variable.

The exhaust temperature average value Texuave is an average value of the exhaust temperatures Texu at an interval of the above-described time series data sampling. More specifically, the CPU 72 samples the exhaust temperature Texu a number of times at the time series data sampling interval, calculates an average value of the exhaust temperatures Texu, and sets the exhaust temperature average value Texuave to the average value. In the same manner, the upstream average value Afuave is an average value of the upstream detection values Afu at an interval of the above-described time series data sampling.

Subsequently, the CPU 72 assigns the values acquired by step S10 to input variables x (1) to x (5sn+1) of a mapping that outputs the catalyst temperature Tcat (S12). More specifically, when m=1 to sn, the CPU 72 substitutes the exhaust temperature average value Texuave into an input variable x (m), assigns the upstream average value Afuave (m) to an input variable x (sn+m), assigns the intake air amount Ga (m) to an input variable x (2sn+m), and assigns the rotational speed NE (m) to an input variable x (3sn+m). In addition, the CPU 72 assigns the charging efficiency η (m) to an input variable x (4sn+m) and assigns the previous cycle value of the catalyst temperature Tcat to an input variable x (5sn+1).

Subsequently, the CPU 72 calculates the catalyst temperature Tcat by inputting the input variables x (1) to x (5sn+1) to a mapping that is specified by mapping data 76a stored in the storage device 76 illustrated in FIG. 1 (S14).

In the present embodiment, The mapping is configured by a neural network in which the number of intermediate layers is "α," activation functions h1 to hα of the intermediate layers are hyperbolic tangents, and an activation function f of an output layer is a rectified linear unit (ReLU). Here, ReLU is a function that outputs the non-lesser one of the input and zero. For example, the node values of a first intermediate layer are generated by inputting the input variables x (1) to x (5sn+1) to a linear mapping specified by a factor w(1)ji (j=0 to n1 and i=0 to 5sn+1) to obtain outputs and inputting the outputs to the activation function h1. More specifically, when m=1, 2, . . . , and α, the node values of an mth intermediate layer are generated by inputting outputs of a linear mapping that is specified by a factor w(m) to an activation function hm. Values n1, n2, . . . , and nα illustrated in FIG. 3 are the numbers of nodes in the first, a second, . . . , and an αth intermediate layers. In addition, w(1)j0 is one of bias parameters, and an input variable x (0) is defined as one.

When step S14 is completed, the CPU 72 temporarily ends the series of steps illustrated in FIG. 3. When the process illustrated in FIG. 3 is executed for the first time, the previous cycle value of the catalyst temperature Tcat may be set to a default value that is determined in advance. Even when the default value is deviated from the actual temperature, the catalyst temperature Tcat converges to th correct value as the process illustrated in FIG. 3 is repeated.

The process that generates the mapping data 76a will now be described.

Figure 4:
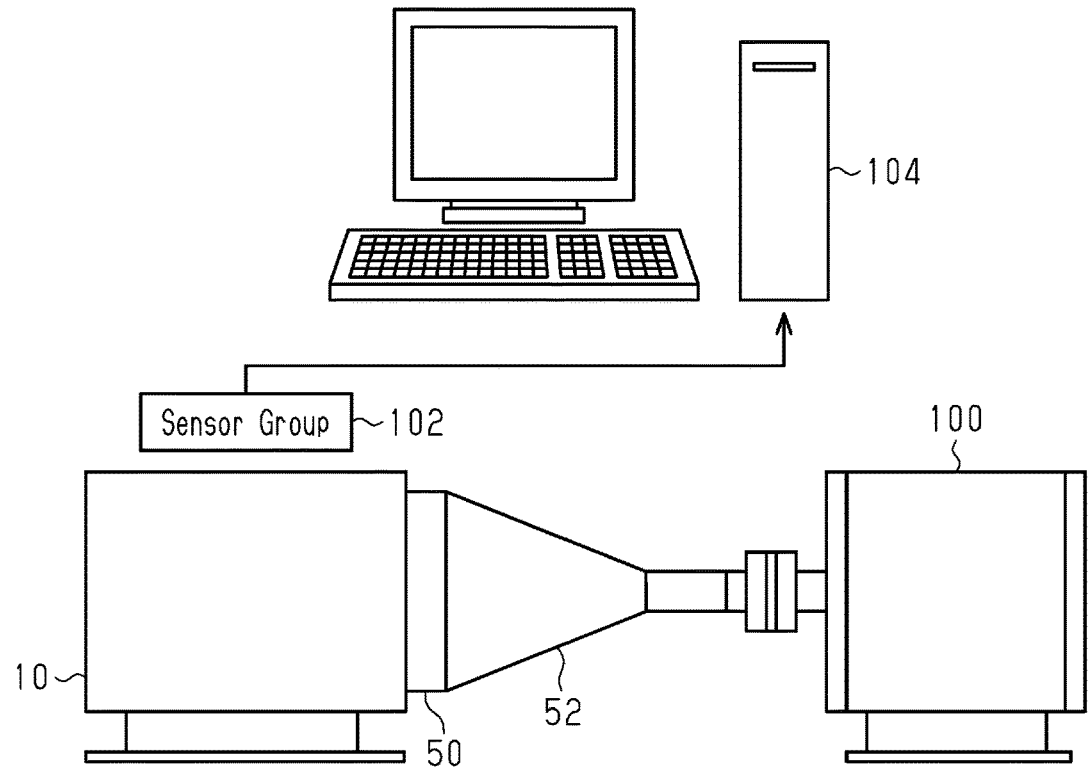
FIG. 4 is a diagram illustrating a system that generates mapping data according to the first embodiment.

FIG. 4 illustrates a system that generates the mapping data 76a.

As illustrated in FIG. 4, in the present embodiment, a dynamometer 100 is mechanically coupled to the crankshaft 24 of the internal combustion engine 10 through the torque converter 50 and the transmission device 52. When the internal combustion engine 10 runs, a sensor group 102 detects various state variables of the internal combustion engine 10. The detection results are input to an adaptation device 104, which is a computer that generates the mapping data 76a. The sensor group 102 includes sensors that detect values used to generate inputs to the mapping such as the airflow meter 80, the exhaust temperature sensor 82, and the upstream air-fuel ratio sensor 84. The sensor group 102 includes a catalyst temperature sensor that detects the temperature of the GPF 34.

Figure 5:
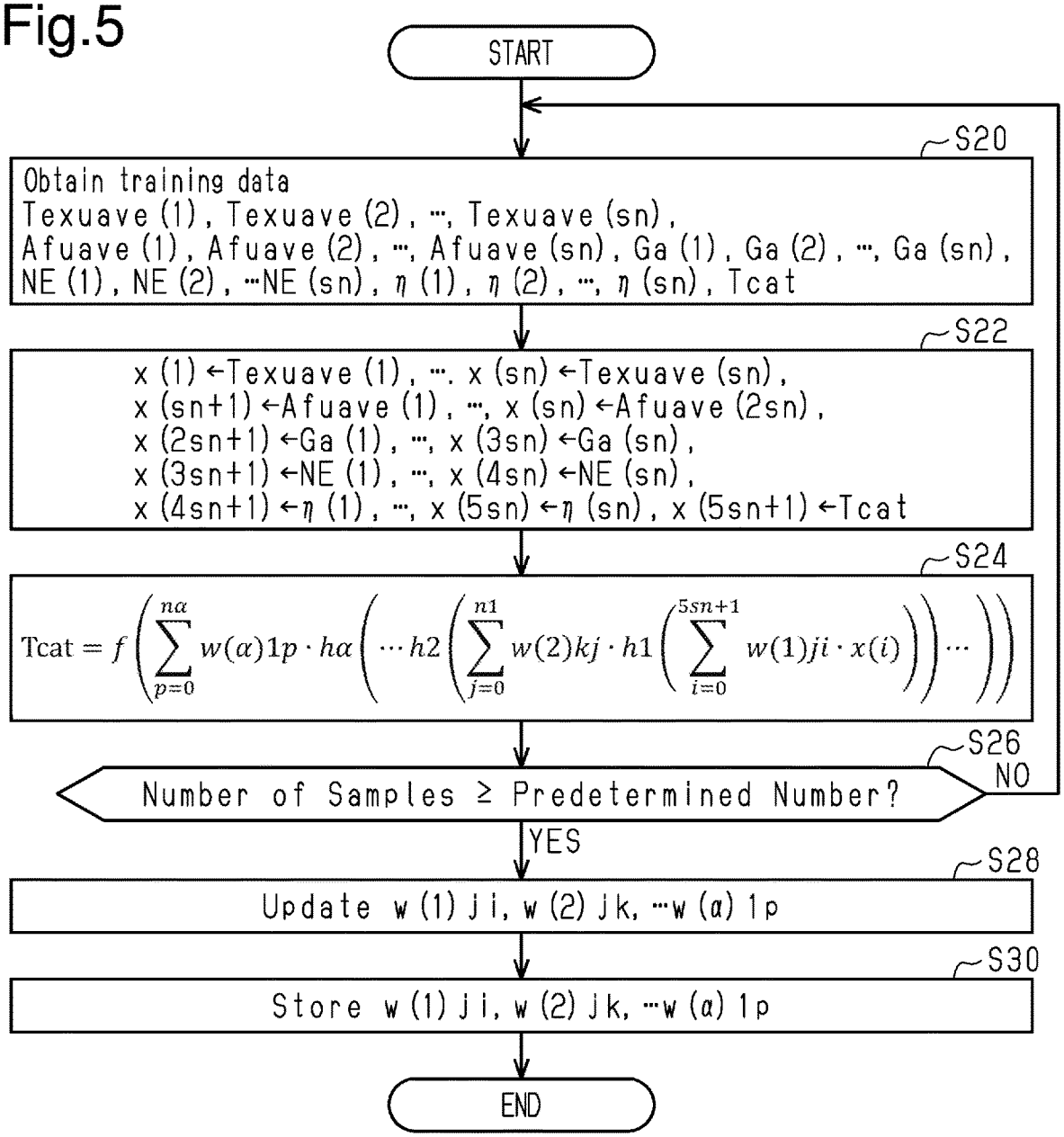
FIG. 5 is a flowchart illustrating the procedures of a mapping data learning process according to the first embodiment.

FIG. 5 illustrates the procedures of a process that generates the mapping data. The process illustrated in FIG. 5 is executed by the adaptation device 104. The process illustrated in FIG. 5 may be implemented, for example, by providing a CPU and a ROM in the adaptation device 104, and causing the CPU to execute a program stored in the ROM.

In the series of steps illustrated in FIG. 5, the adaptation device 104 acquires the same data as that acquired in step S10, as training data, based on the detection results of the sensor group 102 (S20). In addition, in synchronization with the point time of acquiring, a detection value of the catalyst temperature sensor is acquired as teacher data among the training data.

In accordance with the procedure of step S12, the adaptation device 104 assigns the training data other than the teacher data to the input variables x (1) to x (5sn+1) (S22). Then, in accordance with the procedure of step S14, the adaptation device 104 uses the input variables x (1) to x (5sn+1) obtained by step S22 to calculate the catalyst temperature Tcat (S24). Then, the CPU 72 determines whether or not the number of samples of the catalyst temperature Tcat calculated by step S24 is greater than or equal to a predetermined number (S26). Here, in order to obtain the predetermined number of samples or greater, the catalyst temperature Tcat needs to be calculated at various operating points that are specified by the rotational speed NE and the charging efficiency η in accordance with changes in the operation mode of the internal combustion engine 10.

When it is determined that the number of samples is not greater than or equal to the predetermined number (S26: NO), the adaptation device 104 returns to step S20. When it is determined that the number of samples is greater than or equal to the predetermined number (S26: YES), the CPU 72 updates factors w(1)ji, w(2)kj, . . . , and w(α)1p to minimize the sum of the squares of the differences between the detection value of the catalyst temperature sensor as the teacher data and the catalyst temperature Tcat calculated by step S24 (S28). Then, the adaptation device 104 stores the factors w(1)ji, w(2)kj, . . . , and w(α)1p as the mapping data 76a that is learned (S30).

The operation and advantages of the present embodiment will be described.

The mapping data 76a is learned to specify a mapping that uses, as inputs, the time series data of each of the exhaust temperature average value Texuave, the upstream average value Afuave, the intake air amount Ga, the rotational speed NE, and the charging efficiency η, and the previous cycle value of the catalyst temperature Tcat, and outputs the catalyst temperature Tcat. The intake air amount Ga and the exhaust temperature average value Texuave configure a fluid energy variable, that is, a state variable related to the energy of a fluid flowing into the GPF 34. The intake air amount Ga and the upstream average value Afuave configure an excess amount variable, that is, a variable corresponding to the excess amount of the actual fuel in relation to the amount of fuel that reacts with oxygen contained in the fluid flowing into the GPF 34 without excess or deficiency. The amount of fuel that reacts with oxygen contained in the fluid flowing into the GPF 34 without excess or deficiency is referred to as an ideal fuel amount. The excess amount may be a negative value. More specifically, when the amount of actual fuel is deficient in relation to the amount of fuel that reacts with oxygen contained in the fluid flowing into the GPF 34 without excess or deficiency, the excess amount has a negative value.

In addition to exchanging heat with the fluid flowing into the GPF 34, the GPF 34 generates heat when the GPF 34 stores oxygen contained in the fluid and generates heat due to an oxidation reaction between fuel in the fluid and the stored oxygen. The amount of change in the catalyst temperature Tcat from the previous cycle value of the catalyst temperature Tcat caused by the heat exchange and the heat generation is recognized from an exhaust energy variable and the excess amount variable. It may be considered that the catalyst temperature Tcat is calculated based on the exhaust energy variable and the excess amount variable.

When a mapping that uses these variables to output the catalyst temperature Tcat is performed through the adaptation (i.e. calculation) of mapping data, the number of man-hours for the adaptation increases. In this regard, in the present embodiment, machine learning is used, so that increases in the number of man-hours for adaptation are limited.

The present embodiment further obtains the following advantages.

(1) The time series data is used as the input to the mapping instead of using a single sampling value of each of the exhaust temperature average value Texuave, the upstream average value Afuave, the intake air amount Ga, the rotational speed NE, and the charging efficiency η. This allows waveform information of the variables affecting the catalyst temperature Tcat to be used to calculate the catalyst temperature Tcat. With this configuration, the accuracy is readily increased for the cycle of calculating the catalyst temperature Tcat as compared to a configuration that uses a single sampling value. Mapping data that uses the time series data as the input variable and uses the catalyst temperature Tcat as the output variable is not realistic because the number of man-hours for adaption increases enormously. In the present embodiment, instead of using the mapping data, a model that is learned through machine learning is used so that the catalyst temperature Tcat is calculated based on the time series data.

(2) Instead of learning a mapping that randomly inputs a large number of various variables of the internal combustion engine 10 to calculate the catalyst temperature Tcat through machine learning, the variables that are input to a mapping are carefully selected based on the control of the internal combustion engine 10. Thus, the number of intermediate layers in the neural network and the number sn of pieces of data in the time series data are reduced, and the structure of the mapping that calculates the catalyst temperature Tcat is simplified, as compared to a case in which the variables that are input to the mapping are not carefully selected.

(3) The input to the mapping includes the rotational speed NE and the charging efficiency η that configure an operating point variable specifying the operating points of the internal combustion engine 10. The operation amounts of the operation units of the internal combustion engine 10 such as the ignition device 22 and the WGV 42 tend to be variable in accordance with the operating point. When the operating point variable is used as the input to the mapping, the catalyst temperature Tcat, which reflects variations in the operation amount, is calculated.

(4) When the catalyst temperature Tcat, which is calculated with high accuracy, is greater than or equal to the predetermined temperature, the catalyst temperature regulation process M14 sets the increase factor Kot to be greater than one so that the air-fuel ratio of the mixture becomes richer. With this configuration, only when the temperature of the GPF 34 is overly high, the increase factor Kot is set to a value that is greater than one, in comparison to a configuration that sets the increase factor Kot to a value that is greater than one, for example, based on the operating point of the internal combustion engine 10.

(5) The PM accumulation amount calculation process M22 calculates the PM accumulation amount DPM based on the catalyst temperature Tcat, which is calculated with high accuracy. Thus, the PM accumulation amount DPM is calculated with high accuracy. This further allows for highly accurate determination of when the PM accumulation amount DPM is reduced to an amount that allows the regeneration process to be stopped by the regeneration process M24.

(6) The execution and termination of the heating control, which is executed by the regeneration process M24, is determined based on the catalyst temperature Tcat, which is calculated with high accuracy. This allows control of the temperature of the GPF 34 with high accuracy.

(7) The determination to start energizing the downstream air-fuel ratio sensor 86 is made when the catalyst temperature Tcat, which is calculated with high accuracy, reaches the specified value. With this configuration, the downstream air-fuel ratio sensor 86 starts to be energized at a time as close as possible to the time when the downstream air-fuel ratio sensor 86 reaches a temperature at which the downstream air-fuel ratio sensor 86 is practically allowed to be energized.

Second Embodiment

Hereinafter, a second embodiment will be described with reference to the drawings focusing on the differences from the first embodiment.

In the present embodiment, average values of the time series data of each of the intake air amount Ga, the rotational speed NE, and the charging efficiency η are calculated and used as inputs to the mapping. Hereinafter, in FIG. 6, for descriptive purposes, it is assumed in the present embodiment that the number sn of pieces of data in the time series data of each variable acquired by step S10 is a multiple of "five."

Figure 6:
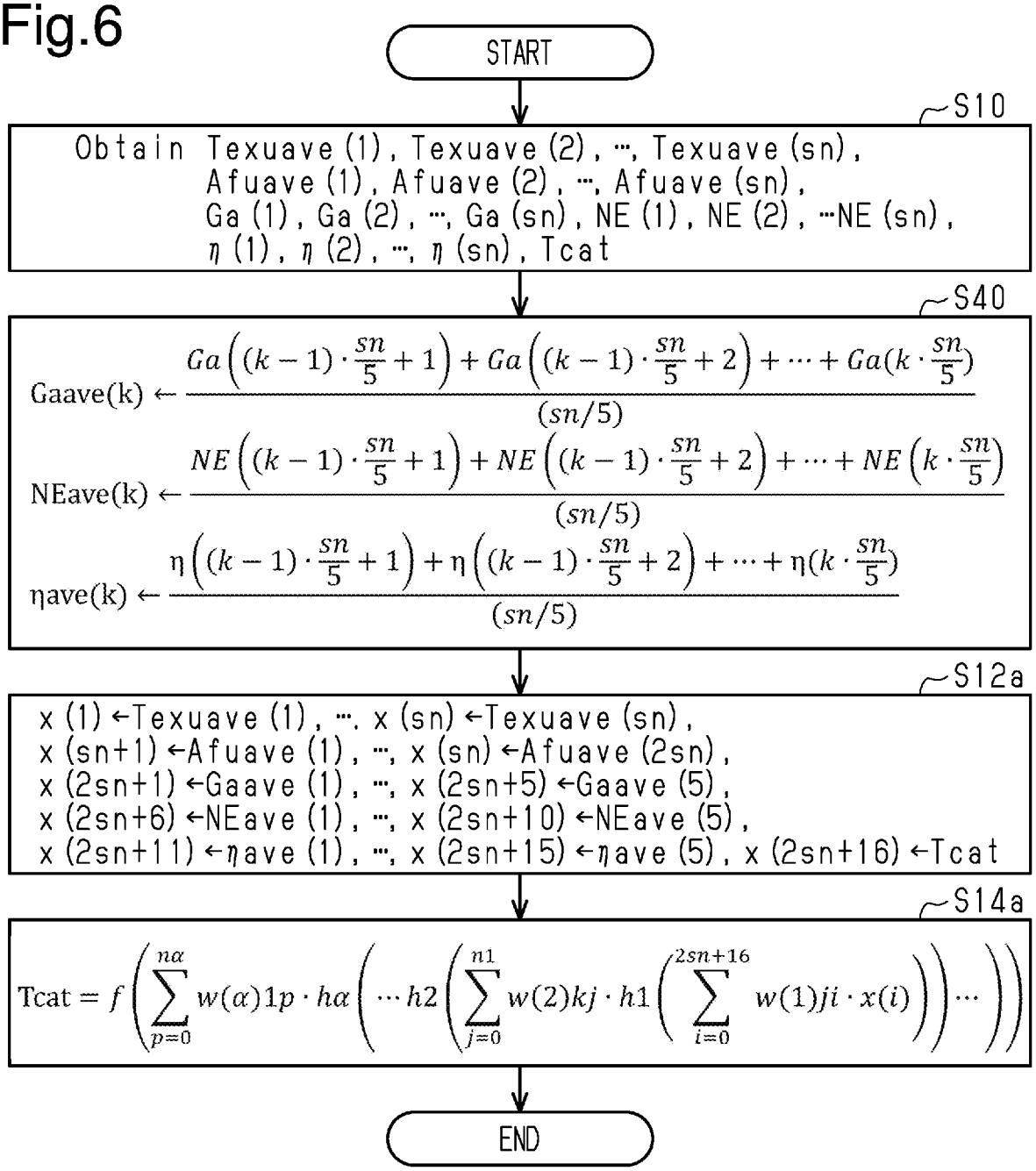
FIG. 6 is a flowchart illustrating the procedures of a catalyst temperature estimation process according to a second embodiment.

FIG. 6 illustrates the procedures of a process executed by the control device 70 in the present embodiment. The process illustrated in FIG. 6 is implemented, for example, by causing the CPU 72 to repeatedly execute the temperature estimation program 74a stored in the ROM 74 illustrated in FIG. 1 at predetermined time intervals. For the sake of convenience, in the process illustrated in FIG. 6, the same step numbers are given to the steps corresponding to the steps illustrated in FIG. 3.

In a series of the steps illustrated in FIG. 6, when step S10 is completed, the CPU 72 calculates an average value of each set of "sn/5" elements in order from the earliest one in each of the intake air amount Ga, the rotational speed NE, and the charging efficiency η (S40). More specifically, for example, the average value of intake air amounts Ga (1), Ga (2), . . . , and Ga (sn/5) is an intake air amount average value Gaave (1). The average value of intake air amounts Ga ((sn/5)+1), Ga ((sn/5)+2), . . . , and Ga (2·(sn/5)) is an intake air amount average value Gaave (2). In this manner, time series data including five sets of intake air amount average values Gaave, the time series data including five sets of rotational speed average values NEave, the time series data including five sets of charging efficiency average values ηave are produced.

Subsequently, the CPU 72 assigns the time series data generated by step S40, the time series data of each of the exhaust temperature average value Texuave and the upstream average value Afuave acquired by step S10, and the previous cycle value of the catalyst temperature Tcat to the input variable x of the mapping (S12a). More specifically, when m=1 to sn, the CPU 72 assigns the exhaust temperature average value Texuave (m) to the input variable x (m) and assigns the upstream average value Afuave (m) to the input variable x (sn+m). When m=1 to 5, the CPU 72 assigns an intake air amount average value Gaave (m) to the input variable x (2sn+m) and assigns a rotational speed average value NEave (m) to an input variable x (2sn+5+m). In addition, the CPU 72 assigns a charging efficiency average value ηave (m) to an input variable x (2sn+10+m) and assigns the previous cycle value of the catalyst temperature Tcat to an input variable x (2sn+16).

Then, the CPU 72 calculates the catalyst temperature Tcat through a neural network that uses the input variables x (1) to x (2sn+16) generated by S12a as inputs to output the catalyst temperature Tcat (S14a). The neural network is similar to that described as an example in step S14 and differs in the factor w(m). In particular, the factor w(1)ji is where "i=0 to 2sn+16."

When step S14a is completed, the CPU 72 temporarily ends the series of steps illustrated in FIG. 6.

As described above, according to the present embodiment, the intake air amount average value Gaave, the rotational speed average value NEave, and the charging efficiency average value ηave are used as the input to the mapping. This reduces the dimensions of the input to the mapping. In the present embodiment, the time series data of the exhaust temperature average value Texuave and the time series data of the intake air amount average value Gaave cooperate to configure the fluid energy variable. The intake air amount average value Gaave represents an intake air amount corresponding to a period in which "sn/5" elements of exhaust temperature average values Texuave are sampled. The time series data of the upstream average value Afuave and the time series data of the intake air amount average value Gaave cooperate to configure the excess amount variable. The intake air amount average value Gaave represents an intake air amount corresponding to a period in which "sn/5" elements of upstream average values Afuave are sampled.

Third Embodiment

Hereinafter, a third embodiment will be described with reference to the drawings focusing on the differences from the first embodiment.

In the present embodiment, the storage device 76 stores four kinds of mapping data as the mapping data 76a.

Figure 7:
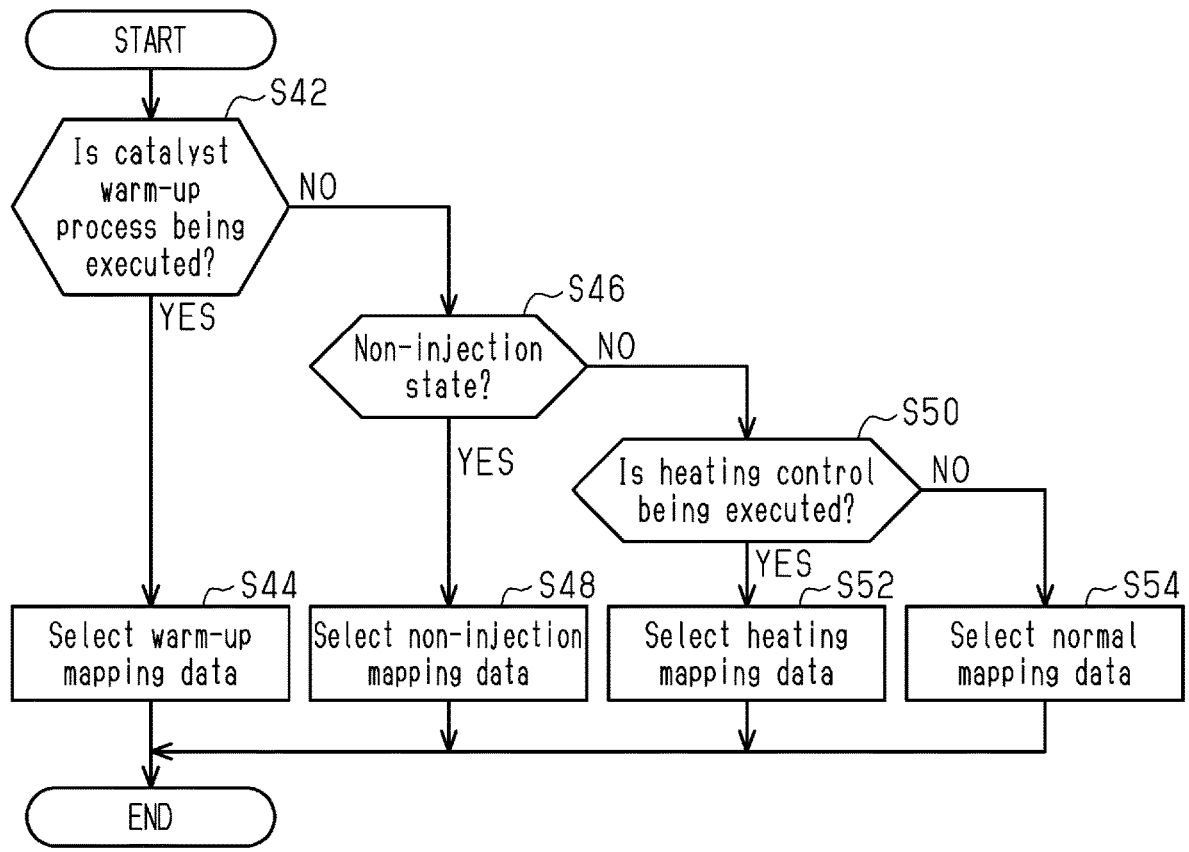
FIG. 7 is a flowchart illustrating the procedures of a selection process according to a third embodiment.

FIG. 7 illustrates the procedures of a process that selects any one of the four types of mapping data to calculate the catalyst temperature Tcat. The process illustrated in FIG. 7 is implemented, for example, by causing the CPU 72 to repeatedly execute the temperature estimation program 74a stored in the ROM 74 illustrated in FIG. 1 at predetermined time intervals.

In the series of steps illustrated in FIG. 7, firstly, the CPU 72 determines whether or not a catalyst warm-up process is being executed (S42). Then, when it is determined that the catalyst warm-up process is being executed (S42: YES), the CPU 72 selects warm-up mapping data (S44). The warm-up mapping data is mapping data that is learned using data of the catalyst warm-up process as training data and dedicated to use when the catalyst warm-up process is executed.

When it is determined that the catalyst warm-up process is not being executed (S42: NO), the CPU 72 determines whether or not the internal combustion engine 10 is in a non-injection state in which fuel is not injected from the in-cylinder injection valves 20 such as when the fuel cutoff process is executed (S46). When it is determined that the internal combustion engine 10 is in the non-injection state (S46: YES), the CPU 72 selects non-injection mapping data (S48). The non-injection mapping data is learned using time series data that is sampled in the non-injection state as training data.

When it is determined that the internal combustion engine 10 is not in the non-injection state (S46: NO), the CPU 72 determines whether or not the heating control is being executed by the regeneration process M24 (S50). When it is determined that the heating control is being executed (S50: YES), the CPU 72 selects heating mapping data (S52). The heating mapping data is learned using time series data that is sampled during the heating control as training data.

When it is determined that the heating control is not being executed (S50: NO), the CPU 72 selects normal mapping data (S54). The normal mapping data is learned using time series data that is sampled in a region excluding the catalyst warm-up process being executed, the non-injection state, and the heating control being executed as training data.

When step S44, S48, S52, or S54 is completed, the CPU 72 temporarily ends the series of steps illustrated in FIG. 7. When changing the mapping data that is used in the calculation of the catalyst temperature Tcat, in step S10 executed immediately after the changing, the CPU 72 acquires the catalyst temperature Tcat that was calculated immediately before the changing as the previous cycle value of the catalyst temperature Tcat.

As described above, in the present embodiment, the catalyst temperature Tcat is calculated using different pieces of mapping data for during execution of the catalyst warm-up process, the non-injection state, during execution of the heating control, and the period outside of these specifically described periods. The energy amounts given to the GPF 34 vary greatly between during execution of the catalyst warm-up process, the non-injection state, during execution of the heating control, and the state outside of these states. If the same mapping data is used in these different situations, the number of intermediate layers is increased and the number sn of pieces of data is increased in order to respond to the greatly varying situations. As a result, the structure of the mapping may become more complicated. In this regard, in the present embodiment, different pieces of mapping data are used in each of the four situations. The structure of the mapping is simplified as compared to a configuration that uses the single mapping data in all situations.

Fourth Embodiment

Hereinafter, a fourth embodiment will be described with reference to the drawings focusing on the differences from the first embodiment.

Figure 8:
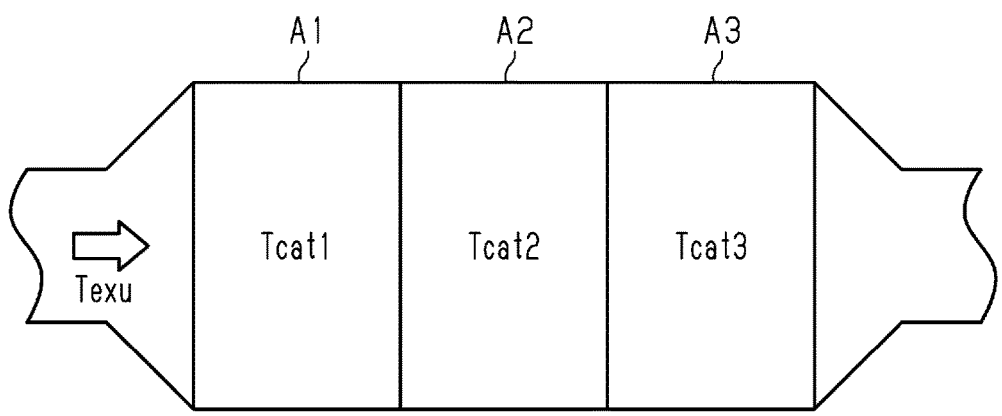
FIG. 8 is a diagram illustrating partial regions of a catalyst according to a fourth embodiment.

In the present embodiment, as illustrated in FIG. 8, the region of the GPF 34 from the upstream side to the downstream side is divided into three partial regions, and the three partial regions are referred to as a first partial region A1, a second partial region A2, and a third partial region A3 in order from the upstream side. The temperatures of the partial regions are referred to as a first temperature Tcat1, a second temperature Tcat2, and a third temperature Tcat3.

Figure 9:
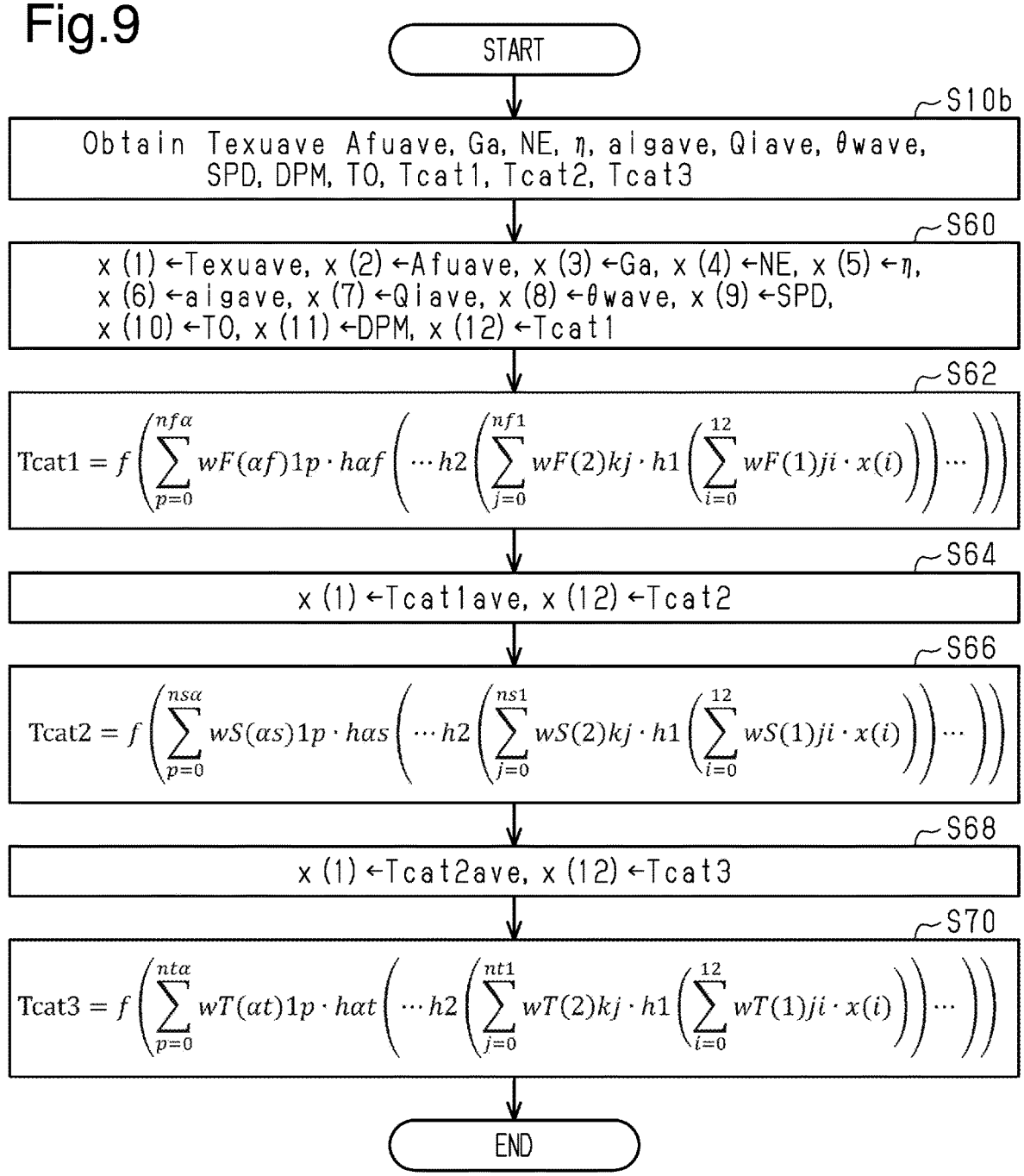
FIG. 9 is a flowchart illustrating the procedures of a catalyst temperature estimation process according to the fourth embodiment.

FIG. 9 illustrates the procedures of a process executed by the control device 70 in the present embodiment. The process illustrated in FIG. 9 is implemented, for example, by causing the CPU 72 to repeatedly execute the temperature estimation program 74a stored in the ROM 74 illustrated in FIG. 1 at predetermined time intervals.

In the series of steps illustrated in FIG. 9, the CPU 72 acquires a single sampling value of each of the following variables (S10b). More specifically, the CPU 72 acquires the exhaust temperature average value Texuave, the upstream average value Afuave, the intake air amount Ga, the rotational speed NE, the charging efficiency η, an ignition timing average value aigave, an increase amount average value Qiave, an opening angle average value θwave, the vehicle speed SPD, the PM accumulation amount DPM, the ambient temperature TO, the first temperature Tcat1, the second temperature Tcat2, and the third temperature Tcat3 (S10b). The exhaust temperature average value Texuave, the upstream average value Afuave, the ignition timing average value aigave, the increase amount average value Qiave, and the opening angle average value θwave are respectively an average value of the exhaust temperatures Texu, an average value of the upstream detection values Afu, an average value of ignition timings aig, an average value of increase amounts Qi, and an average value of opening angles θw obtained in the time interval of step S10b. The increase amount average value Qiave is an average value of the increase amounts Qi of the request injection amount Qd corresponding to "Qb KAF." The increase amount average value Qiave may be a negative value. The increase amount average value Qiave is an excess or deficient amount of the actual fuel in relation to the amount of fuel that sets the air-fuel ratio of the mixture to the theoretical air-fuel ratio. The increase amount average value Qiave configures the excess amount variable. The opening angle θw is the angle at which the WGV 42 is open. All of the first temperature Tcat1, the second temperature Tcat2, and the third temperature Tcat3 acquired in step S10b are the previous cycle values.

The CPU 72 assigns the values of the variables acquired in step S10b excluding the second temperature Tcat2 and the third temperature Tcat3 to the input variables of a mapping that outputs the first temperature Tcat1 (S60). More specifically, the CPU 72 assigns the exhaust temperature average value Texuave to the input variable x (1), assigns the upstream average value Afuave to the input variable x (2), assigns the intake air amount Ga to the input variable x (3), assigns the rotational speed NE to the input variable x (4), assigns the charging efficiency η to the input variable x (5), and assigns the ignition timing average value aigave to the input variable x (6). The CPU 72 assigns the increase amount average value Qiave to the input variable x (7), assigns the opening angle average value θwave to the input variable x (8), and assigns the vehicle speed SPD to the input variable x (9). The CPU 72 assigns the ambient temperature TO to the input variable x (10), assigns the PM accumulation amount DPM to the input variable x (11), and assigns the previous cycle value of the first temperature Tcat1 to the input variable x (12).

Subsequently, the CPU 72 inputs the input variables x (1) to x (12) to a mapping that outputs the first temperature Tcat1 to calculate the first temperature Tcat1 (S62). The mapping is configured by a neural network in which the number of intermediate layers is "αf," activation functions h1 to hαf of the intermediate layers are hyperbolic tangents, and the activation function f of an output layer is a ReLU. For example, the node values of a first intermediate layer are generated by inputting the input variables x (1) to x (12) to a linear mapping that is specified by a factor wF(1)ji (j=0 to nf1 and i=0 to 12) to obtain outputs and inputting the outputs to the activation function h1. More specifically, when m=1, 2, . . . , and α1, the node values of an mth intermediate layer are generated by inputting an output of a linear mapping that is specified by a factor wF(m) to an activation function hm. Values nf1, nf2, . . . , and nfα illustrated in FIG. 9 are the numbers of nodes in the first, a second, . . . , and an αfth intermediate layers. In addition, wF(1)j0 is one of bias parameters, and the input variable x (0) is defined as one.

Subsequently, the CPU 72 generates the input variables x (1) to x (12) of a mapping that outputs the second temperature Tcat2 (S64). The input variables x (2) to x (11) are the same as those generated in S60. The CPU 72 assigns a first temperature average value Tcat1ave to the input variable x (1) and assigns the previous cycle value of the second temperature Tcat2 to the input variable x (12). The first temperature average value Tcat1ave is an average value of the latest sampling values of the first temperature Tcat1 including the current cycle value of the first temperature Tcat1, which is the first temperature Tcat1 calculated in the current cycle of step S62.

Subsequently, the CPU 72 inputs the input variables x (1) to x (12) to the mapping that outputs the second temperature Tcat2 to calculate the second temperature Tcat2 (S66). The mapping is configured by a neural network in which the number of intermediate layers is "αs," activation functions h1 to hαs of the intermediate layers are hyperbolic tangents, and the activation function f of an output layer is a ReLU. For example, the node values of a first intermediate layer are generated by inputting the input variables x (1) to x (12) to a linear mapping that is specified by a factor wS(1)ji (j=0 to ns1 and i=0 to 12) to obtain outputs and inputting the outputs to the activation function h1. More specifically, when m=1, 2, . . . , and αs, the node values of an mth intermediate layer are generated by inputting the outputs of a linear mapping that is specified by a factor wS(m) to an activation function hm. Values ns1, ns2, . . . , and nsα illustrated in FIG. 9 are the numbers of nodes in the first, a second, . . . , and an αsth intermediate layers. In addition, wS(1)j0 is one of bias parameters, and the input variable x (0) is defined as one.

Subsequently, the CPU 72 generates the input variables x (1) to x (12) of a mapping that outputs the third temperature Tcat3 (S68). The input variables x (2) to x (11) are the same as those generated in S60. The CPU 72 assigns a second temperature average value Tcat2ave to the input variable x (1) and assigns the previous cycle value of the third temperature Tcat3 to the input variable x (12). The second temperature average value Tcat2ave is an average value of the latest sampling values of the second temperature Tcat2 including the current cycle value of the second temperature Tcat2, which is the second temperature Tcat2 calculated in the current cycle of step S66.

Subsequently, the CPU 72 inputs the input variables x (1) to x (12) to the mapping that outputs the third temperature Tcat3 to calculate the third temperature Tcat3 (S70). The mapping is configured by a neural network in which the number of intermediate layers is "αt," activation functions h1 to hαt of the intermediate layers are hyperbolic tangents, and the activation function f of an output layer is a ReLU. For example, the node values of a first intermediate layer are generated by inputting the input variables x (1) to x (12) to a linear mapping that is specified by a factor wT(1)ji (j=0 to nt1 and i=0 to 12) to obtain outputs and inputting the outputs to the activation function h1. More specifically, when m=1, 2, . . . , and αt, the node values of an mth intermediate layer are generated by inputting the outputs of a linear mapping that is specified by a factor wT(m) to an activation function hm. Values nt1, nt2, . . . , and ntα illustrated in FIG. 9 are the numbers of nodes in the first, a second, . . . , and an αtth intermediate layers. In addition, wT(1)j0 is one of bias parameters, and the input variable x (0) is defined as one.

When step S70 is completed, the CPU 72 temporarily ends the series of steps illustrated in FIG. 9. Mapping data that specifies the mappings that calculate each of the first temperature Tcat1, the second temperature Tcat2, and the third temperature Tcat3 may be generated using a detection value of a temperature sensor that detects the temperature of the corresponding partial region of the GPF 34 as teacher data.

The catalyst temperature regulation process M14 illustrated in FIG. 2 is configured to increase the injection amount when the greatest one of the first temperature Tcat1, the second temperature Tcat2, and the third temperature Tcat3 is greater than or equal to the predetermined temperature. The PM accumulation amount calculation process M22 is configured to calculate the PM oxidation amount of the GPF 34, for example, based on the average value of the first temperature Tcat1, the second temperature Tcat2, and the third temperature Tcat3. The regeneration process M24 is configured to control the first temperature Tcat1, the second temperature Tcat2, and the third temperature Tcat3 so that all of the temperatures are within the predetermined range. The downstream energization process M26 is configured to start to energize the downstream air-fuel ratio sensor 86 when the third temperature Tcat3 is greater than or equal to the predetermined temperature.

As described above, in the present embodiment, the GPF 34 is divided into the partial regions, and the temperature of each region is estimated. The first temperature average value Tcat1ave is input to the mapping that outputs the second temperature Tcat2, so that heat exchange between the first partial region and the second partial region is reflected in the calculation of the second temperature Tcat2. The second temperature average value Tcat2ave is input to the mapping that outputs the third temperature Tcat3, so that heat exchange between the second partial region and the third partial region is reflected in the calculation of the third temperature Tcat3. Thus, the heat exchange in the GPF 34 is simply reflected in the calculation. While simplifying the structure of the mapping that outputs the temperature of each partial region, the temperatures are calculated with high accuracy as compared to a mapping that outputs a single temperature of the GPF 34.

The present embodiment further obtains the following advantages.

(8) The opening angle average value θwave is included in the input to the mapping. Since the specific heat of the turbocharger 14 is large, when exhaust passes through the turbocharger, heat is readily removed from the exhaust as compared to when the exhaust passes through the bypass passage 40. For this reason, the temperature of the GPF 34 differs in accordance with the proportion of the exhaust that flows into the GPF 34 through the bypass passage 40. In the present embodiment, the temperature of the GPF 34 is calculated based on the opening angle average value θwave, so that the temperature is calculated with high accuracy as compared to a configuration in which the input does not include the opening angle average value θwave.

(9) The vehicle speed SPD is included in the input to the mapping. When the vehicle speed SPD is high, air flow produced during traveling is increased and facilitates dissipation of heat from the GPF 34 as compared to when the vehicle speed SPD is low. For this reason, the vehicle speed SPD is a variable that is correlated with the temperature of the GPF 34. In the present embodiment, the temperature of the GPF 34 is calculated based on the vehicle speed SPD, so that the temperature is calculated with high accuracy as compared to a configuration in which the input does not include the vehicle speed SPD.

(10) The PM accumulation amount DPM is included in the input to the mapping. When the PM is accumulated in the GPF 34 and oxygen flows into the GPF 34, an oxidation reaction occurs between PM and oxygen. As a result, the temperature of the GPF 34 is increased. In the present embodiment, the temperature of the GPF 34 is calculated based on the PM accumulation amount DPM, so that the temperature is calculated with high accuracy as compared to a configuration in which the input does not include the PM accumulation amount DPM.

Fifth Embodiment

Hereinafter, a fifth embodiment will be described with reference to the drawings focusing on the differences from the first embodiment.

In the present embodiment, a mapping used to estimate the temperature in a steady state is different from a mapping used to estimate the actual temperature based on the temperature in the steady state.

Figure 10:
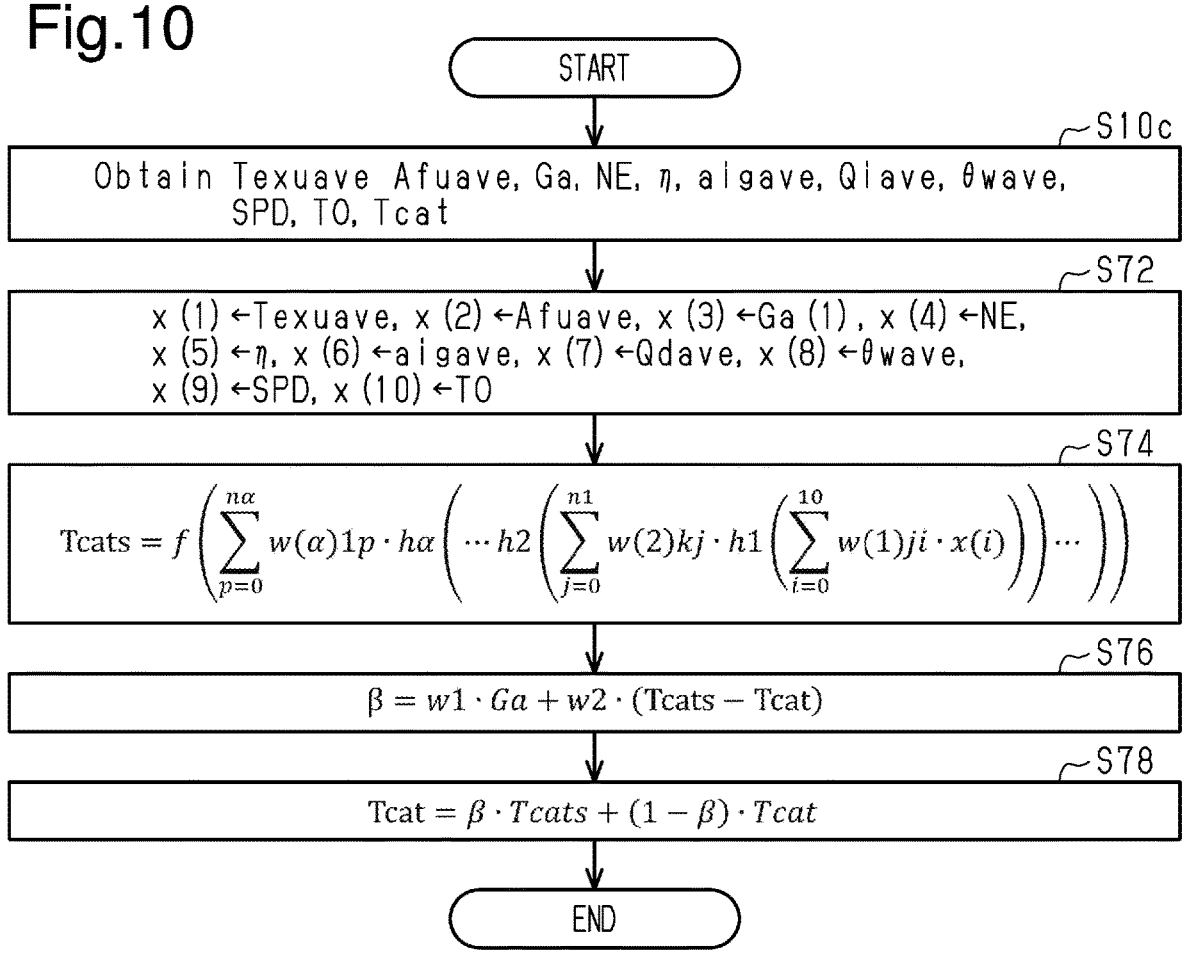
FIG. 10 is a flowchart illustrating the procedures of a catalyst temperature estimation process according to a fifth embodiment.

FIG. 10 illustrates the procedures of a process executed by the control device 70 in the present embodiment. The process illustrated in FIG. 10 is implemented, for example, by causing the CPU 72 to repeatedly execute the temperature estimation program 74a stored in the ROM 74 illustrated in FIG. 1 at predetermined time intervals.

In the series of steps illustrated in FIG. 10, the CPU 72 acquires the exhaust temperature average value Texuave, the upstream average value Afuave, the intake air amount Ga, the rotational speed NE, the charging efficiency η, the ignition timing average value aigave, the increase amount average value Qiave, the opening angle average value θwave, the vehicle speed SPD, the ambient temperature TO, and the previous cycle value of the catalyst temperature Tcat (S10c). Then, the CPU 72 assigns the variables acquired by step S10c, excluding the previous cycle value of the catalyst temperature Tcat, to the input variables x (1) to x (10) (S72). The input variables x (1) to x (10) are the same as those in step S60.

The CPU 72 inputs the input variables x (1) to x (10) to a mapping that outputs the steady temperature Teats to calculate a steady temperature Tcats (S74). The steady temperature Tcats is the temperature of the GPF 34 in a steady state, which is, for example, when the amount of change in the operating point variable of the internal combustion engine 10 is less than or equal to a specified value.

The mapping described above is configured by a neural network in which the number of intermediate layers is "a," the activation functions h1 to hα of the intermediate layers are hyperbolic tangents, and the activation function f of an output layer is a ReLU. For example, the node values of a first intermediate layer are generated by inputting the input variables x (1) to x (10) to a linear mapping that is specified by a factor w(1)ji (j=0 to nf1 and i=0 to 10) to obtain outputs and inputting the outputs to the activation function h1. More specifically, when m=1, 2, . . . , and α, the node values of an mth intermediate layer are generated by inputting outputs of a linear mapping that is specified by a factor w(m) to an activation function hm. The values n1, n2, . . . , and nα illustrated in FIG. 10 are the number of nodes in the first, the second, . . . , and the αth intermediate layers. In addition, w(1)j0 is one of bias parameters, and an input variable x (0) is defined as one.

Mapping data that specifies this mapping may be generated, for example, based on teacher data when the internal combustion engine 10 steadily runs at each of the various operating points.

The CPU 72 calculates a time constant β when the catalyst temperature Tcat is changed to the steady temperature Tcats based on a mapping configured by a linear regression equation that uses the intake air amount Ga and a value obtained by subtracting the catalyst temperature Tcat from the steady temperature Tcats as inputs (S76). The linear regression equation may be obtained, for example, by measuring a behavior until the actual temperature is changed to the steady temperature and learning the behavior as teacher data.

Then, the CPU 72 updates the catalyst temperature Tcat to the sum of a value obtained by multiplying the steady temperature Tcats by the time constant μ and a value obtained by multiplying the previous cycle value of the catalyst temperature Tcat by "1-β" (S78).

When step S78 is completed, the CPU 72 temporarily ends the series of steps illustrated in FIG. 10.

As described above, in the present embodiment, the catalyst temperature Tcat is calculated using the mapping calculating the steady temperature Tcats and the mapping calculating the time constant β. This reduces the requirements for each mapping. While simplifying the structures of the mappings, the temperature is calculated with high accuracy as compared to a configuration that uses a single mapping that outputs the catalyst temperature Tcat.

Sixth Embodiment

Hereinafter, a sixth embodiment will be described with reference to the drawings focusing on the differences from the first embodiment.

In the present embodiment, the process that calculates the catalyst temperature Tcat is executed outside the vehicle.

Figure 11:
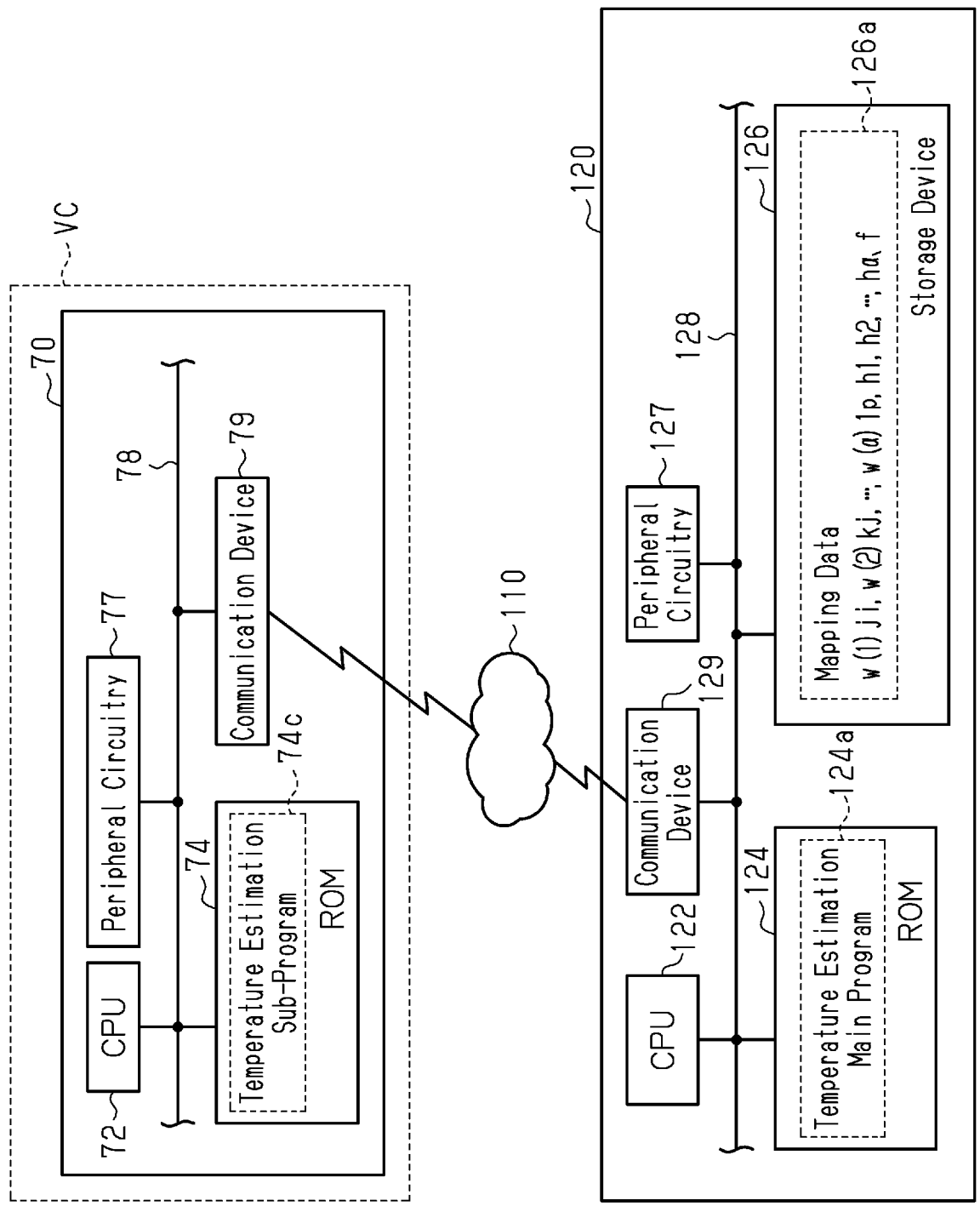
FIG. 11 is a block diagram illustrating the configuration of a catalyst temperature estimation system according to a sixth embodiment.

FIG. 11 illustrates a temperature estimation system according to the present embodiment. For the sake of convenience, in FIG. 11, the same reference characters are given to the members corresponding to the members illustrated in FIG. 1.

The control device 70 installed in the vehicle VC illustrated in FIG. 11 includes a communication device 79. The communication device 79 is a device that communicates with a center 120 through a network 110 outside the vehicle VC.

The center 120 analyzes data received from a plurality of vehicles VC. The center 120 includes a CPU 122, a ROM 124, a storage device 126, peripheral circuitry 127, and a communication device 129. These devices are configured to communicate with each other through a local network 128. The ROM 124 stores a temperature estimation main program 124a. The storage device 126 stores mapping data 126a.

Figure 12:
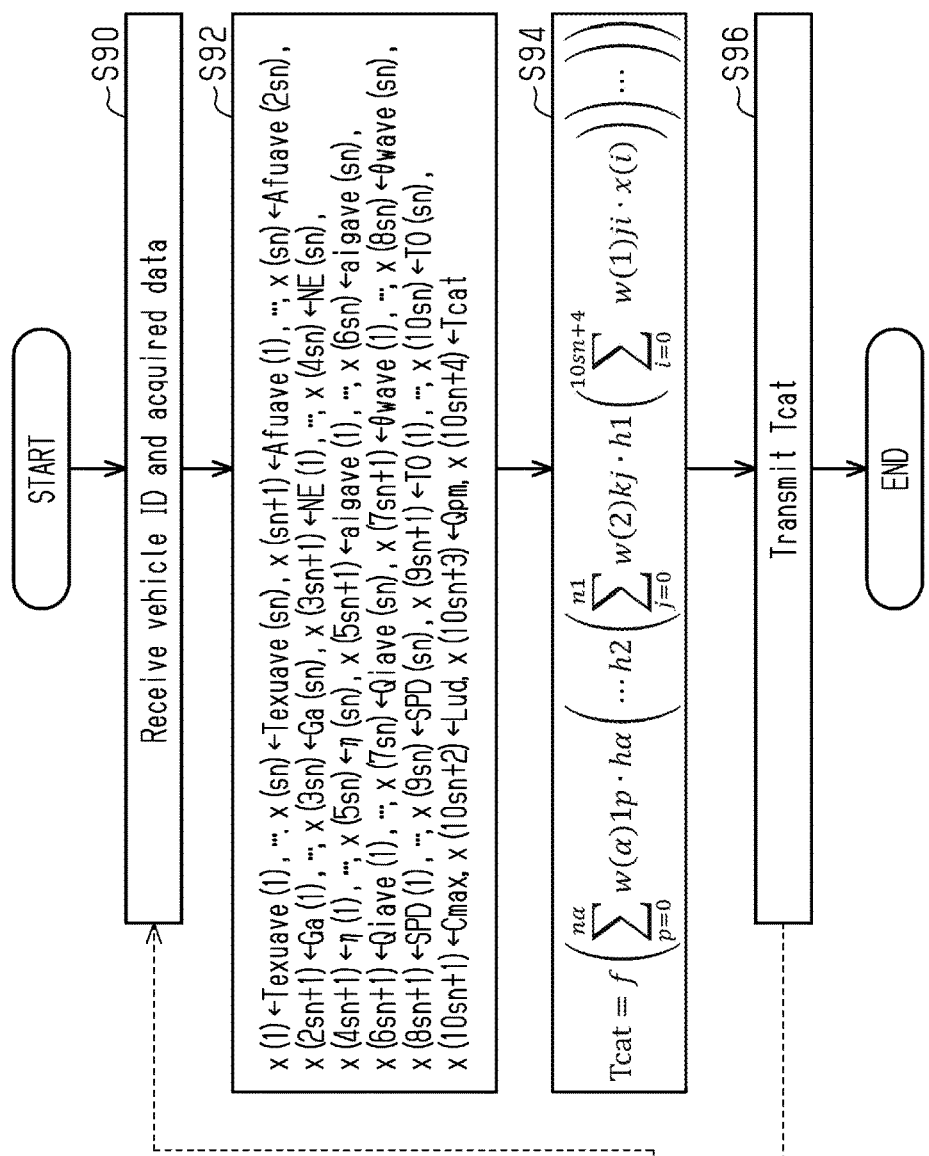
FIG. 12 is a flowchart illustrating the procedures of a process executed by the catalyst temperature estimation system according to the sixth embodiment.

FIG. 12 illustrates the procedures of a process executed by the system illustrated in FIG. 11. The process illustrated in (a) in FIG. 12 is realized by causing the CPU 72 to execute a temperature estimation sub-program 74c stored in the ROM 74 illustrated in FIG. 11. The process illustrated in (b) in FIG. 12 is realized by causing the CPU 122 to execute the temperature estimation main program 124a stored in the ROM 124. Hereinafter, the processes illustrated in FIG. 12 will be described along the time series of the temperature estimation process.

As illustrated in (a) in FIG. 12, the CPU 72 in the vehicle VC acquires variables as the input to the mapping in addition to the time series data acquired in step S10 (S10d). More specifically, the CPU 72 acquires the time series data of each of the ignition timing average value aigave, the increase amount average value Qiave, the opening angle average value θwave, the vehicle speed SPD, and the ambient temperature TO. The CPU 72 acquires a maximum value Cmax of an oxygen storage amount at a reference temperature, a length Lud from an upstream side to a downstream side, and a support amount Qpm of a noble metal, as specification variables, that is, variables indicating the specifications among the state variables of the GPF 34. This is a setting for calculating the temperature of the GPF 34 having various specifications with single mapping data.

The CPU 72 transmits the data acquired by step S10d to the center 120 together with a vehicle ID, which is data indicating the identification information of the vehicle (S80).

As illustrated in (b) in FIG. 12, the CPU 122 of the center 120 receives the transmitted data (S90) and assigns the data acquired by step S90 to the input variable x of a mapping (S92). The CPU 122 assigns the same values as those in step S12 to the input variables x (1) to x (5sn). In addition, when m=1 to sn, the CPU 122 assigns an ignition timing average value aigave (m) to an input variable x (5sn+m), assigns an increase amount average value Qiave (m) to an input variable x (6sn+m), and assigns an opening angle average value θwave (m) to an input variable x (7sn+m). In addition, the CPU 122 assigns a vehicle speed SPD(m) to an input variable x (8sn+m) and assigns an ambient temperature TO(m) to an input variable x (9sn+m). The CPU 122 assigns the maximum value Cmax to x (10sn+1), assigns the length Lud to an input variable x (10sn+2), assigns the support amount Qpm to an input variable x (10sn+3), and assigns the previous cycle value of the catalyst temperature Tcat to an input variable x (10sn+4).

The CPU 122 inputs the input variables x (1) to x (10sn+4) generated by S92 to a mapping that is specified by the mapping data 126a to calculate the catalyst temperature Tcat (S94). The mapping specified by the mapping data 126a is similar to that used in step S14 and differs in the factor w(m) In particular, the variable i, which specifies the factor w(1)ji, is "from 0 to 10sn+4."

The CPU 122 operates the communication device 129 to transmit a signal related to the catalyst temperature Tcat to the vehicle VC from which the data is received in step S90, (S96). Then, the CPU 122 temporarily ends a series of the steps illustrated in (b) in FIG. 12. As illustrated in (a) in FIG. 12, the CPU 72 receives the catalyst temperature Tcat (S82) and temporarily ends a series of the steps illustrated in (a) in FIG. 12.

As described above, in the present embodiment, since the catalyst temperature Tcat is calculated in the center 120, the computational load imposed on the CPU 72 is reduced.

Correspondence Relationship

The correspondence relationships between the items in the embodiments described above and the items described in the section titled "Summary" are as follows. Hereinafter, the correspondence relationship is shown with the numeral of each aspect described in the section titled "Summary."

[1 and 12] The catalyst corresponds to the GPF 34. The execution device, that is, the processing circuitry, corresponds to the CPU 72 and the ROM 74. The fluid energy variable corresponds to a data set of the exhaust temperature average value Texuave and the intake air amount Ga or the like. The ambient temperature variable corresponds to the ambient temperature TO. The excess amount variable corresponds to, for example, a data set of the upstream average value Afuave and the intake air amount Ga and the increase amount average value Qiave. The acquisition process corresponds to steps S10, S10b, and S10c. The temperature calculation process corresponds to steps S12 and S14, steps S12a and S14a, steps S60 to S70, and steps S72 to S78. The operation process corresponds to the catalyst temperature regulation process M14, the regeneration process M24, and the downstream energization process M26.

[2] The flow path variable corresponds to the opening angle average value θwave.

[3] The fluid temperature variable corresponds to the exhaust temperature average value Texuave. The ignition variable corresponds to the ignition timing average value aigave.

[4] The accumulation amount variable corresponds to the PM accumulation amount DPM.

[5] corresponds the process illustrated in FIG. 9. In particular, N corresponds to "three."

[6] The steady mapping corresponds to the mapping which is used in step S74. The air amount variable corresponds to the intake air amount Ga. The time constant calculation process corresponds to step S76.

[7] The time series data of the fluid energy variable corresponds to the time series data of each of the exhaust temperature average value Texuave and the intake air amount Ga and the time series data of each of the exhaust temperature average value Texuave and the intake air amount average value Gaave.

[8 and 9] The temperature variable corresponds to the exhaust temperature average value Texuave.

[10 and 11] The selection process corresponds to the process illustrated in FIG. 7.

[13] The catalyst temperature estimation system corresponds to the control device 70 and the center 120. The first execution device corresponds to the CPU 72 and the ROM 74. The second execution device corresponds to the CPU 122 and the ROM 124. The acquisition process corresponds to step S10d. The vehicle side transmission process corresponds to step S80. The vehicle side reception process corresponds to step S82. The outside reception process corresponds to step S90. The temperature calculation process corresponds to steps S92 and S94. The vehicle side transmission process corresponds to step S96.

[14] The data analysis device corresponds to the center 120.

[15] The control device of the internal combustion engine corresponds to the control device 70.

Other Embodiments

The embodiments can be implemented with the following modifications. The combinations of these embodiments and the following modified examples may be made and implemented without departing from the technical scope.

Different Kinds of Mapping Data

In the process illustrated in FIG. 7, the warm-up mapping data, the non-injection mapping data, the heating mapping data, and the normal mapping data are provided. However, the present disclosure is not limited to such a configuration. In an example, the normal mapping data and only one of the warm-up mapping data, the non-injection mapping data, and the mapping data for heating may be provided. In another example, the normal mapping data and only two of the warm-up mapping data, the non-injection mapping data, and the heating mapping data may be provided.

For example, different pieces of mapping data that specifies a mapping that outputs the catalyst temperature Tcat may be provided for each region that is divided based on the rotational speed NE and the charging efficiency η. For example, different kinds of mapping data that specifies a mapping that outputs the catalyst temperature Tcat may be provided for each region that is divided based on the intake air amount Ga. In these cases, the input to the mapping does not have to include both of the rotational speed NE and the charging efficiency and the intake air amount Ga.

Fluid Temperature Variable

The fluid temperature variable, which configures the fluid energy variable, is not limited to the exhaust temperature average value Texuave and may be the exhaust temperature Texu. The fluid temperature variable is not limited to that determined based on the detection value of the exhaust temperature obtained by the exhaust temperature sensor 82. The fluid temperature variable may be determined based on, for example, an estimation value.

Fluid Energy Variable

For example, in the processes illustrated in FIGS. 3, 9, 10, and 12, the input variables may not include the intake air amount Ga. Also, with this configuration, since the rotational speed NE and the charging efficiency η are used as the input variables in these processes, the fluid energy variable is configured by the three variables, namely, the exhaust temperature average value Texuave, the rotational speed NE, and the charging efficiency η.

For example, in the process illustrated in FIG. 6, the input variables may not include the intake air amount average value Gaave. Also, with this configuration, since the rotational speed average value NEave and the charging efficiency average value ηave are used as the input variables, the fluid energy variable is configured by the exhaust temperature average value Texuave, the rotational speed average value NEave, and the charging efficiency average value ηave.

The time series data of the fluid energy variable may be configured by the time series data of the exhaust temperature average value Texuave and a single value of the intake air amount Ga. The time series data of the fluid energy variable may be configured by the time series data of the exhaust temperature average value Texuave and a single value of the intake air amount average value Gaave. The time series data of the fluid energy variable may be configured by the time series data of the exhaust temperature average value Texuave and single sampling values of the rotational speed NE and the charging efficiency $\eta$. The time series data of the fluid energy variable may be configured by the time series data of the exhaust temperature average value Texuave and single sampling values of the rotational speed average value NEave and the charging efficiency average value $\eta$ave.

As described in the section titled "Different Kinds of Mapping Data," for example, in a case in which different kinds of mapping data that specifies a mapping that outputs the catalyst temperature Tcat are provided for each region that is divided based on the rotational speed NE and the charging efficiency $\eta$, the fluid energy variable may also be configured by solely the exhaust temperature Texu or the exhaust temperature average value Texuave. Also, as described below in the section titled "Vehicle," for example, in a case in which the internal combustion engine 10 is installed in a series hybrid vehicle and the internal combustion engine 10 is driven only at predetermined operating points, the fluid energy variable may also be configured by solely the exhaust temperature Texu or the exhaust temperature average value Texuave.

The fluid energy variable is not limited to that configured by the temperature variable such as the exhaust temperature Texu or the exhaust temperature average value Texuave. For example, from the viewpoint that the exhaust temperature is determined based on the rotational speed NE and the charging efficiency $\eta$, the fluid energy variable may be configured by the operating point variables such as the rotational speed NE and the charging efficiency $\eta$ of the internal combustion engine 10.

Excess Amount Variable

For example, in the processes illustrated in FIGS. 3, 9, 10, and 12, the input variables may not include the intake air amount Ga. Also, with this configuration, since the rotational speed NE and the charging efficiency $\eta$ are used as the input variables in in these processes, the excess amount variable is configured by the three variables, namely, the upstream average value Afuave, the rotational speed NE, and the charging efficiency $\eta$. In a case in which the increase amount average value Qiave is used as the input variable, the excess amount variable is also configured by the increase amount average value Qiave. In the process illustrated in FIG. 6, the input variables may not include the intake air amount average value Gaave. Also, in this case, the excess amount variable is configured by the upstream average value Afuave, the rotational speed average value NEave, and the charging efficiency average value $\eta$ave.

In the above description, instead of using the upstream average value Afuave, the upstream detection value Afu may be used. Instead of using the increase amount average value Qiave, the increase amount Qi may be used.

The time series data of the excess amount variable may be configured by the time series data of the upstream average value Afuave and a single value of the intake air amount Ga. The time series data of the excess amount variable may be configured by the time series data of the upstream average value Afuave and a single value of the intake air amount average value Gaave. The time series data of the excess amount variable may be configured by the time series data of the upstream average value Afuave and single sampling values of the rotational speed NE and the charging efficiency $\eta$. The time series data of the excess amount variable may be configured by the time series data of the upstream average value Afuave and single sampling values of the rotational speed average value NEave and the charging efficiency average value $\eta$ave.

As described below in the section titled "Input to Mapping," in a case in which the GPF 34 is arranged downstream of the catalyst 36 and the temperature of the GPF 34 is estimated, the excess amount variable is configured by the downstream detection value Afd or an average value of the downstream detection values Afd instead of using the upstream detection value Afu.

Alternatively, instead of using the increase amount Qi, the excess amount variable may be configured by an increase ratio that is obtained by dividing the increase amount Qi by "Qb·KAF" or an average value of the increase ratio and "Qb·KAF." The excess amount variable may be configured by the increase ratio or an average value of the increase ratios, the intake air amount Ga, and the rotational speed NE. The excess amount variable may be configured by the increase ratio or an average value of the increase ratios, and the charging efficiency $\eta$. The definitions of the increase amount Qi and the increase ratio are not limited to those described above. For example, in a case in which the target value Afu* is changed to a slightly leaner or richer than the theoretical air-fuel ratio, the base injection amount Qb is regarded as the amount of fuel that reacts with oxygen in the mixture, which is subject to combustion, without excess or deficiency, the increase amount Qi may be "Qd−Qb," and the increase ratio may be a value obtained by dividing the increase amount Qi by the base injection amount Qb.

The excess amount variable does not necessarily have to be used as an input variable. Also, with such a configuration, for example, in a case in which the air-fuel ratio of the mixture in the combustion chamber 18 is constantly controlled to the theoretical air-fuel ratio, or the like, the catalyst temperature Tcat is accurately calculated.

As described in the section titled "Different Kinds of Mapping Data," for example, in a case in which different kinds of mapping data that specifies a mapping that outputs the catalyst temperature Tcat are provided for each region divided based on the rotational speed NE and the charging efficiency $\eta$, the excess amount variable may also be configured by solely the upstream average value Afuave, the upstream detection value Afu, or the increase ratio. Also, as described below in the section titled "vehicle," in a case in which the internal combustion engine 10 is installed in a series hybrid vehicle and the internal combustion engine 10 is driven only at predetermined operating points, the excess amount variable may also be configured by solely the upstream average value Afuave, the upstream detection value Afu, the increase ratio.

Flow Path Variable

In the embodiments described above, the opening angle average value $\theta$wave is provided as an example of the flow path variable. However, the flow path variable is not limited to this value and may be, for example, the opening angle $\theta$w.

Ignition Variable

In the embodiments described above, the ignition timing average value aigave is provided as an example of the ignition variable. However, the ignition variable is not limited to this value. The ignition variable may be, for example, the ignition timing aig.

Operating Point Variable

The operating point variable is not limited to the rotational speed NE and the charging efficiency $\eta$. The operating point variable may be, for example, the intake air amount Ga and the rotational speed NE. As described below in the section titled "Internal Combustion Engine," in a case in which a compression-ignition internal combustion engine is used, the operating point variable may be the injection amount and the rotational speed NE. The operating point variable does not necessarily have to be used as the input to the mapping.

Partial Region

In the embodiments described above, the catalyst, the temperature of which is estimated, is divided into three partial regions. However, the present disclosure is not limited to such a configuration. For example, the catalyst may be divided into two partial regions or may be divided into four or more partial regions.

Input to Mapping (a) Input to Mapping for Each Partial Region

The inputs to the mappings that output a first temperature to an Nth temperature are not limited to those including all of the variables illustrated in FIG. 9. For example, in a case in which the catalyst, the temperature of which is estimated, is the catalyst 36, the PM accumulation amount DPM may be deleted. Even in a case in which the temperature of the GPF 34 is estimated, the PM accumulation amount DPM does not necessarily have to be included in the input to the mapping.

In the process illustrated in FIG. 9, the current cycle value of the first temperature Tcat1 is included in the calculation of the first temperature average value Tcat1ave, which is an input to the mapping that outputs the second temperature Tcat2. However, the present disclosure is not limited to such a configuration. In addition, instead of including the first temperature average value Tcat1ave in the input to the mapping that outputs the second temperature Tcat2, the current cycle value or the previous cycle value of the first temperature Tcat1 may be included in the input to the mapping that outputs the second temperature Tcat2. In the same manner as the input to the mapping that outputs the second temperature Tcat2, the input to the mapping that outputs the third temperature Tcat3 may be changed.

For example, the time series data of the exhaust temperature Texu or the exhaust temperature average value Texuave may be included in the input to the mapping that outputs the first temperature Tcat1. For example, when "i" is an integer greater than or equal to two, time series data of the "i−1"th temperature Tcati−1 may be included in the input to a mapping that outputs the ith temperature Tcati. For example, the exhaust temperature Texu, an average value of the exhaust temperatures Texu, or time series data of the exhaust temperature Texu and the average value may be included in the input to the mapping that outputs the ith temperature Tcati.

(b) Input to Mapping Outputting Steady Temperature

The input to the mapping that outputs the steady temperature is not limited to all of the elements illustrated in FIG. 10. For example, as described below in the section titled "Internal Combustion Engine," in a case in which the internal combustion engine 10 does not include the turbocharger 14, the opening angle average value θwave does not have to be included in the input to the mapping. Even in a case in which the internal combustion engine 10 includes the turbocharger 14, the opening angle average value θwave does not necessarily have to be included in the input to the mapping that outputs the steady temperature.

(c) Input to Mapping Used by Center 120

In the processes illustrated in FIG. 12, all of the illustrated input variables do not necessarily have to be used as input variables. For example, the specification variable of the catalyst may be configured by only one or two of the maximum value Cmax, the length Lud from the upstream side to the downstream side, and the support amount Qpm and may be used as an input variable. The specification variable does not necessarily have to be used as the input to the mapping.

(d) Input to Mapping Used in Vehicle VC

The input variables that are illustrated in the processes of FIG. 12 and that are not included in the input to the mapping used in the vehicle VC in the embodiments described above may be included in the input to the mapping used in the vehicle VC.

(e) Others

For example, in a case in which the time series data of the exhaust energy variable is input, a single variable may be used as an input variable for the other variables.

For example, the input to the mapping may include a storage amount variable, that is, a variable related to the oxygen storage amount in each partial region of the catalyst, which is estimated, from the upstream side to the downstream side. For example, the storage amount variable may be calculated by calculating an increase or decrease amount of the oxygen storage amount and updating the storage amount in accordance with the increase or decrease amount. First, for the most upstream region, the increase or decrease amount is obtained through map calculation based on the upstream detection value Afu and the intake air amount Ga. Next, for the adjacent downstream region, the increase or decrease amount in the oxygen storage amount is obtained through map calculation based on the upstream detection value Afu, the increase or decrease amount in the most upstream region, and the intake air amount Ga. Then, for the further downstream region, the increase or decrease amount is obtained through map calculation based on the upstream detection value Afu, the sum of the increase or decrease amounts in the most upstream region and the adjacent region, and the intake air amount Ga. In this manner, the increase or decrease amount in a target region is obtained through map calculation based on the sum of the increase or decrease amounts in all of the regions upstream of the target region, the upstream detection value Afu, and the intake air amount Ga.

For example, as described below in the section titled "Filter," in a case in which the GPF 34 is arranged downstream of the catalyst 36 and the temperature of the GPF 34 is estimated, instead of using the upstream detection value Afu and the average value of the upstream detection values Afu, the downstream detection value Afd and the average value of the downstream detection values Afd are used as the input to the mapping. In a case in which detection values of the exhaust temperature and the average value of the detection values are used as the input to the mapping, detection values of a sensor arranged between the GPF 34 and the catalyst 36 are used.

The input to the neural network and the input to the regression equation are not limited to those configured by physical quantities each having a single dimension. For example, in the above-described embodiments, different kinds of the physical quantities that are input to the mapping and are directly input to the neural network or the regression equation. Instead, one or more of the different kinds of the physical quantities may be analyzed for their main components, and the main components may be directly input to the neural network or the regression equation. However, in a case in which main components are input to the neural network or the regression equation, the main components do not necessarily have to be only a portion of the input to the neural network or the regression equation. The entirety of the input may be the main components. In a case in which the main components are included in the inputs, the mapping data 76a and 126a include data that specifies a mapping determining the main components.

Time Constant Mapping

The mapping that outputs the time constant β shown in FIG. 10 is not limited to that determined by the linear regression equation. For example, the time constant β may be an output obtained by inputting the output of the linear regression equation shown in FIG. 10 to a non-linear function. However, the time constant β is not limited to such a configuration. For example, a neural network that outputs the time constant β may be used. Input variables of the neural network may be the intake air amount Ga and a difference between the steady temperature Tcats and the catalyst temperature Tcat. However, the input variables may include the three variables, namely, the intake air amount Ga, the steady temperature Tcats, and the catalyst temperature Tcat. In addition, the mapping is not limited to that including a model learned through machine learning. For example, the mapping may be configured to output a time constant using mapping data.

Mapping Data

In the embodiments described above, the activation functions h1, h2, . . . , and hα in steps S14, 14a, S74, and S94 are hyperbolic tangents. The activation functions h1, h2, . . . , and hαf; the activation functions h1, h2, . . . , and hαs; and the activation functions h1, h2, . . . , and hαt in the process illustrated in FIG. 8 are hyperbolic tangents. The activation function f is a ReLU. However, the present disclosure is not limited to such a configuration. For example, the activation functions h1, h2, . . . , and hα in steps S14, 14a, S74, and S94 may be a ReLU or a logistic sigmoid function. The activation functions h1, h2, . . . , and hαf; the activation functions h1, h2, . . . , and hαs; and the activation functions h1, h2, . . . , and hαt in the process illustrated in FIG. 8 may be a ReLU or a logistic sigmoid function. In addition, for example, the activation function f may be a logistic sigmoid function.

In the neural networks illustrated in the drawings, the number of intermediate layers is more than two. However, the present disclosure is not limited to such a configuration. The number of intermediate layers may be one or two. In particular, in the processes illustrated in FIGS. 8 and 9 or in a case in which different kinds of mapping data are used, the number of intermediate layers may be less than or equal to two or may be one.

Operation Process

In the embodiments described above, the PM oxidation process is provided as an example of the regeneration process. However, the regeneration process is not limited to this process and may be, for example, a sulfur poisoning recovery process.

The operation process of the operation units of the internal combustion engine 10 using the catalyst temperature Tcat is not limited to those provided as examples in the embodiments described above and may be, for example, a process that stops the warm-up process of the catalyst when the catalyst temperature Tcat reaches a predetermined temperature.

Mapping Data Generation

In the embodiments described above, the training data is the data acquired when running the internal combustion engine 10 in a state in which the dynamometer 100 is connected to the crankshaft 24 through the torque converter 50 and the transmission device 52. However, the present disclosure is not limited to such a configuration. For example, the training data may be data that is acquired when the internal combustion engine 10 is driven in a state in which the internal combustion engine 10 is installed in the vehicle VC.

Data Analysis Device

Data that specifies a mapping that outputs the temperature for each partial region may be included in the center 120, and the temperature may be calculated by the center 120. The process illustrated in FIG. 10 may be executed by the center 120.

The process illustrated in (b) in FIG. 12 may be executed, for example, using a portable terminal that is carried by the user.

Execution Device

The execution device is not limited to that including the CPU 72 (CPU 122) and the ROM 74 (ROM 124) and executing software processes using the CPU 72 (CPU 122) and the ROM 74 (ROM 124). For example, the execution device may include a dedicated hardware circuit (e.g., ASIC) that processes at least some of the software processes executed in the embodiments described above. More specifically, the execution device may have any one of the following configurations (a) to (c). Configuration (a) includes a processing device that executes all of the above-described processes according to programs, and a program storage device such as a ROM that stores the programs. Configuration (b) includes a processing device that executes some of the above-described processes according to programs, a program storage device, and a dedicated hardware circuit that executes the remaining processes. Configuration (c) includes a dedicated hardware circuit that executes all of the above-described processes. A plurality of software execution devices, each of which includes the processing device and the program storage device, may be provided. A plurality of dedicated hardware circuits may be provided. More specifically, the above-described processes may be executed by processing circuitry that includes at least one of one or more of software execution devices and one or more of dedicated hardware circuits. The program storage device, that is, a computer readable medium, includes any available medium that can be accessed by a general-purpose or dedicated computer.

Storage Device

In the embodiments described above, the storage devices that store the mapping data 76a and 126a and the storage devices (ROM 74 and ROM 124) differ from the storage devices that store the temperature estimation program 74a and the temperature estimation main program 124a. However, the storage devices are not limited to such a configuration.

Temperature Estimation Subject

The subject, the temperature of which is estimated, is not limited to the GPF 34 and may be, for example, a three-way catalyst.

Filter

The GPF 34 and the catalyst 36 may be reversely arranged. In addition, the filter is not limited to that supporting a three-way catalyst. For example, a three-way catalyst may be provided upstream of a single catalytic converter, and a filter that does not support a three-way catalyst may be provided downstream of the catalytic converter.

Internal Combustion Engine

The internal combustion engine does not necessarily have to include the turbocharger.

In the embodiments described above, the in-cylinder injection valve that injects fuel into the combustion chamber 18 is provided as an example of a fuel injection valve.

However, the fuel injection valve is not limited to this type. For example, the fuel injection valve may be a port injection valve that injects fuel into the intake passage 12. Both of the port injection valve and the in-cylinder injection valve may be provided.

The internal combustion engine is not limited to a spark ignition internal combustion engine and may be, for example, a compression-ignition internal combustion engine that uses diesel as fuel.

The internal combustion engine does not necessarily have to configure a drive system. For example, the internal combustion engine may be installed in a series hybrid vehicle, in which the crankshaft is mechanically coupled to an on-board generator and power transmission is disconnected between the internal combustion engine and the drive wheel 60.

Vehicle

The vehicle is not limited to a vehicle including only the internal combustion engine as a device that generates propulsion power of the vehicle. The vehicle may be, for example, a parallel hybrid vehicle or a series and parallel hybrid vehicle in addition to the series hybrid vehicle described in the section titled "Internal Combustion Engine."

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A catalyst temperature estimation device configured to estimate a temperature of a catalyst provided in an exhaust passage of an internal combustion engine, the catalyst temperature estimation device, comprising:

a storage device; and
   processing circuitry, wherein
   the storage device stores mapping data that specifies a mapping that uses multiple input variables to output an estimation value of the temperature of the catalyst,
   the multiple input variables include at least one variable of an ambient temperature variable or an excess amount variable, the ambient temperature variable is a variable related to an ambient temperature around the internal combustion engine, an amount of fuel that reacts with oxygen contained in a fluid flowing into the catalyst without excess or deficiency is an ideal fuel amount, and the excess amount variable is a variable that corresponds to an excess amount of an actual fuel flowing into the catalyst in relation to the ideal fuel amount,
   the multiple input variables further include a fluid energy variable, which is a state variable related to an energy of the fluid flowing into the catalyst, and a previous cycle value of the estimation value of the temperature of the catalyst,
   the processing circuitry is configured to execute
      an acquisition process that acquires the at least one variable, the fluid energy variable, and the previous cycle value of the estimation value of the temperature of the catalyst,
      a temperature calculation process that repeatedly calculates the estimation value of the temperature of the catalyst based on an output of the mapping that uses data acquired by the acquisition process as an input, and
      an operation process that operates an operation unit of the internal combustion engine based on the estimation value of the temperature of the catalyst, the operation unit being configured to adjust the temperature of the catalyst, and
   the mapping data includes data that is learned through machine learning.

2. The catalyst temperature estimation device according to claim 1, wherein
   the internal combustion engine includes a turbocharger provided upstream of the catalyst in the exhaust passage,
   the exhaust passage includes a bypass passage that bypasses the turbocharger, and the bypass passage has a flow path cross-sectional area that is allowed to be adjusted by a wastegate valve,
   the input to the mapping includes a flow path variable that differs from the fluid energy variable, the flow path variable being a variable related to the flow path cross-sectional area of the bypass passage,
   the acquisition process includes a process that acquires the flow path variable, and
   the temperature calculation process includes a process that calculates the estimation value based on an output of the mapping further using the flow path variable as the input to the mapping.

3. The catalyst temperature estimation device according to claim 1, wherein
   the fluid energy variable includes a temperature variable that is a variable related to a temperature of the fluid flowing into the catalyst,
   the input to the mapping includes an ignition variable that differs from the fluid energy variable, the ignition variable being a variable related to an ignition timing of the internal combustion engine,
   the acquisition process includes a process that acquires the ignition variable, and
   the temperature calculation process includes a process that calculates the estimation value based on an output of the mapping further using the ignition variable as the input to the mapping.

4. The catalyst temperature estimation device according to claim 1, wherein
   the catalyst is supported by a filter configured to capture particulate matter (PM) in a fluid flowing into the filter,
   the input to the mapping includes an accumulation amount variable that is a variable related to an amount of PM accumulated in the filter,
   the acquisition process includes a process that acquires the accumulation amount variable, and
   the temperature calculation process includes a process that calculates the estimation value based on an output of the mapping further using the accumulation amount variable as the input to the mapping.

5. The catalyst temperature estimation device according to claim 1, wherein the catalyst is divided into N partial regions arranged in a flow direction of the fluid, the N partial regions are arranged from a first partial region to an Nth partial region in order from the upstream side, and the acquisition process includes a process that acquires a previous cycle value of an estimation value of a temperature of each region from the first partial region to the Nth partial region as the previous cycle value of the estimation value of the temperature of the catalyst, the mapping is one of multiple mappings, the multiple mappings include a first mapping being a mapping that outputs the estimation value of the temperature of the first partial region and an ith mapping being a mapping that outputs an estimation value of a temperature of an ith partial region, where "i" is an integer that is greater than or equal to two and less than or equal to N, the first mapping uses at least a variable acquired by the acquisition process, the variable excluding the previous cycle values of the estimation values of the partial regions arranged downstream of the first partial region, as an input, and the ith mapping uses at least an estimation value of a temperature of an "i-1"th partial region and a previous cycle value of the estimation value in the ith partial region as inputs, and the temperature calculation process includes a process that calculates the estimation value of the temperature of each region from the first partial region to the Nth partial region through processes, the processes including a process that uses at least a variable acquired by the acquisition process, the variable excluding the previous cycle values of the estimation values of the partial regions arranged downstream of the first partial region, as an input to the first mapping to calculate the estimation value of the temperature of the first partial region, and a process that uses at least the estimation value of the temperature of the "i-1"th partial region and the previous cycle value of the estimation value of the ith partial region as inputs to the ith mapping to calculate the estimation value of the temperature of the ith partial region.

6. The catalyst temperature estimation device according to claim 1, wherein the mapping is one of multiple mappings, the multiple mappings include a steady mapping and a time constant mapping, the steady mapping uses the fluid energy variable and at least one of the ambient temperature variable or the excess amount variable as inputs to output a steady temperature, which is a value on which the temperature of the catalyst converges when the internal combustion engine is steadily running, the time constant mapping uses the steady temperature, the previous cycle value of the estimation value, and an air amount variable, which is a variable related to an intake air amount of the internal combustion engine, as inputs to output a time constant variable, which is a variable that determines a time constant in which the temperature of the catalyst converges to the steady temperature, the acquisition process includes a process that acquires the air amount variable, the temperature calculation process includes:

a steady calculation process that calculates the steady temperature based on an output of the steady mapping using the fluid energy variable and at least one of the ambient temperature variable or the excess amount variable as inputs, a time constant calculation process that calculates the time constant variable through the time constant mapping using the air amount variable, the steady temperature, and the previous cycle value of the estimation value as inputs, and a process that calculates the estimation value by causing the estimation value of the temperature of the catalyst to approach the steady temperature in accordance to the time constant variable calculated by the time constant calculation process, and mapping data that specifies the steady mapping is learned through the machine learning.

7. The catalyst temperature estimation device according to claim 1, wherein the mapping uses time series data of the fluid energy variable as an input in addition to the previous cycle value of the estimation value of the temperature of the catalyst to output the estimation value of the temperature of the catalyst, the acquisition process includes a process that acquires the time series data of the fluid energy variable as the fluid energy variable, and a calculation process of the estimation value calculated by the temperature calculation process using the fluid energy variable as the input to the mapping is a calculation process of the estimation value using the time series data of the fluid energy variable as the input to the mapping.

8. The catalyst temperature estimation device according to claim 7, wherein the time series data of the fluid energy variable includes time series data of a temperature variable that is a variable related to the temperature of the fluid flowing into the catalyst from the upstream side of the catalyst in the exhaust passage in a predetermined period.

9. The catalyst temperature estimation device according to claim 8, wherein the time series data of the fluid energy variable is configured to include the time series data of the temperature variable in the predetermined period and an air amount variable that is a variable related to an intake air amount of the internal combustion engine in the predetermined period, and the air amount variable in the predetermined period has fewer samplings than the time series data of the temperature variable.

10. The catalyst temperature estimation device according to claim 1, wherein the mapping data is one of different kinds of mapping data, the storage device stores the different kinds of mapping data, and the temperature calculation process includes a selection process that selects one of the different kinds of mapping data as mapping data that is used to calculate the estimation value of the temperature of the catalyst.

11. The catalyst temperature estimation device according to claim 10, wherein the storage device stores different kinds of mapping data that specify separate mappings corresponding to at least one of whether a fuel is supplied to a combustion chamber of the internal combustion engine, whether a warm-up process of the catalyst is executed, or whether a heating process of the catalyst is executed, and the selection process includes a process that selects one of the different kinds of mapping data as mapping data that is used to calculate the estimation value of the temperature of the catalyst.

12. The catalyst temperature estimation device according to claim 1, wherein the operation process includes a process that sets an air-fuel ratio of a mixture that is burned in a combustion chamber of the internal combustion engine to be richer when the temperature of the catalyst is greater than or equal to a predetermined temperature than when the temperature of the catalyst is less than the predetermined temperature.

13. A catalyst temperature estimation system, comprising:

a storage device; and processing circuitry, wherein the storage device stores mapping data that specifies a mapping that uses multiple input variables to output an estimation value of a temperature of a catalyst provided in an exhaust passage of an internal combustion engine, the multiple input variables include at least one variable of an ambient temperature variable or an excess amount variable, the ambient temperature variable is a variable related to an ambient temperature around the internal combustion engine, an amount of fuel that reacts with oxygen contained in a fluid flowing into the catalyst without excess or deficiency is an ideal fuel amount, and the excess amount variable is a variable that corresponds to an excess amount of an actual fuel flowing into the catalyst in relation to the ideal fuel amount, the multiple input variables further include a fluid energy variable, which is a state variable related to an energy of the fluid flowing into the catalyst, and a previous cycle value of the estimation value of the temperature of the catalyst, the processing circuitry is configured to execute an acquisition process that acquires the at least one variable, the fluid energy variable, and the previous cycle value of the estimation value of the temperature of the catalyst, a temperature calculation process that repeatedly calculates the estimation value of the temperature of the catalyst based on an output of the mapping that uses data acquired by the acquisition process as an input, and an operation process that operates an operation unit of the internal combustion engine based on the estimation value of the temperature of the catalyst, the operation unit being configured to adjust the temperature of the catalyst, and the mapping data includes data that is learned through machine learning, the processing circuitry includes a first execution device and a second execution device, the first execution device is installed in a vehicle and is configured to execute the acquisition process, a vehicle side transmission process that transmits data acquired by the acquisition process outside the vehicle, a vehicle side reception process that receives a signal based on the estimation value calculated by the temperature calculation process, and the operation process, and the second execution device is arranged outside the vehicle and is configured to execute an outside reception process that receives data transmitted by the vehicle side transmission process, the temperature calculation process, and an outside transmission process that transmits a signal based on the estimation value calculated by the temperature calculation process to the vehicle.

* * * * *